United States Patent [19]
Kondo et al.

[11] Patent Number: 5,914,819
[45] Date of Patent: Jun. 22, 1999

[54] IMAGE PICKUP APPARATUS HAVING LENS HOLDING UNIT AND ADJUSTMENT MECHANISM

[75] Inventors: Kazuyuki Kondo, Kawasaki; Hidetoshi Tanaka, Yokohama; Kazushi Kitajima; Yukio Takemura, both of Kawasaki, all of Japan

[73] Assignee: Canon Kabushiki Kaisha, Tokyo, Japan

[21] Appl. No.: 08/052,468

[22] Filed: Apr. 26, 1993

[30] Foreign Application Priority Data

May 1, 1992 [JP] Japan ................................. 4-139962

[51] Int. Cl.$^6$ .................................................. G02B 15/14
[52] U.S. Cl. ........................... 359/679; 359/686; 359/683
[58] Field of Search .................................. 359/686, 683, 359/676, 679, 739, 740, 782

[56] References Cited

U.S. PATENT DOCUMENTS

| | | | |
|---|---|---|---|
| 4,560,242 | 12/1985 | Tokuhara et al. | 359/679 |
| 4,800,414 | 1/1989 | Takeda | 355/58 |
| 4,865,433 | 9/1989 | Okajima et al. | 350/429 |
| 4,894,682 | 1/1990 | Kondo et al. | 355/55 |
| 5,184,251 | 2/1993 | Tsuchida et al. | 359/686 |

FOREIGN PATENT DOCUMENTS

| | | |
|---|---|---|
| 0423409 | 4/1991 | European Pat. Off. . |
| 0474563 | 3/1992 | European Pat. Off. . |
| 57-67909 | 4/1982 | Japan . |
| 57-189109 | 11/1982 | Japan ................................. 359/683 |
| 9100538 | 1/1991 | Japan . |
| 560976 | 3/1993 | Japan ................................. 359/686 |
| 5119259 | 5/1993 | Japan ................................. 359/686 |
| 2088081 | 6/1982 | United Kingdom . |

*Primary Examiner*—Georgia Epps
*Assistant Examiner*—Jordan M. Schwartz
*Attorney, Agent, or Firm*—Fitzpatrick, Cella, Harper & Scinto

[57] ABSTRACT

An image pickup apparatus has an adjusting mechanism for zoom lens unit so that the apparatus is made compactly. The zoom lens unit is constituted by a first group having a negative refracting power, a second group having a positive refracting power, a stop, a third group having a positive refracting power and a fourth group having a negative refracting power which are sequentially arranged from the object side to be substantially symmetrical about the stop. An image forming magnification is changed by moving whole system and moving the second and third groups on an optical axis thereof while a distance between an object and the image is kept constant. Image formation characteristics of the overall lens system are adjusted by moving and/or decentering the first group and/or the fourth group on/from the optical axis.

7 Claims, 29 Drawing Sheets

IMAGE PICKUP APPARATUS HAVING LENS HOLDING UNIT AND ADJUSTMENT MECHANISM

BACKGROUND OF THE INVENTION

1. Field of the Invention

The present invention relates to an image pickup apparatus having a lens holding unit and an adjustment mechanism, which is suitably used as an image pickup apparatus such as a copying machine designed to perform image formation by forming original images, illuminated with light through a slit, on the surface of an image carrier, e.g., a photosensitive member, at various magnifications by moving an imaging lens (zoom lens) on the optical axis using, e.g., a variable magnification mechanism.

2. Related Background Art

A zoom lens has been conventionally used as an imaging lens for an image pickup apparatus such as a copying machine having a variable magnification mechanism. A zoom lens of this type is disclosed, for example, in Japanese Laid-Open Patent Application No. 57-67909.

In this official gazette, a so-called four-group zoom lens is disclosed, which comprises a first group as a stationary group, a second group as a movable group, a stop, a third group as a movable group, and a fourth group as a stationary group which are sequentially arranged from the object side (original surface side). The first group is constituted by one negative lens and has negative refracting power. The second group is constituted by three lenses, i.e., a positive lens, a negative lens, and a positive lens, and has positive refracting power. The third group is constituted by three lenses, i.e., a positive lens, a negative lens, a positive lens, and has positive refracting power. The fourth group is constituted by one negative lens and has negative refracting power. These four groups are arranged to be substantially symmetrical about the stop. The magnification of this zoom lens is continuously changed by moving the second and third groups on the optical axis while moving the overall lens system.

In such a four-group zoom lens, changes in image formation characteristics due to deviations from set values of, e.g., the lens surface precision, the lens thickness, and the refractive index of a lens material, an assembly error of each constituent element, and the like are corrected by moving the second and third groups as movable groups in the direction of the optical axis to finely adjust the focal length.

FIG. 1 is a sectional view showing a main part of a copying machine as an electrophotographic copying machine of a slit exposure scheme. Referring to FIG. 1, reflected light 2 from an original 1 illuminated with a beam of light from a light source 5 through a slit is reflected by mirrors M1, M2, and M3 to be focused on a photosensitive drum 4 by a zoom lens 3 through mirrors M4, M5, and M6. The original 1 is sequentially moved/scanned, from an end portion a to an end portion b, at the same speed. At the same time, the photosensitive drum 4 is rotated to perform development/transfer of the original image by a known electrophotographic process, thus visualizing the image on a transfer sheet.

In an image pickup apparatus having a variable magnification mechanism, the distance from the surface of the original 1 to that of the photosensitive drum 4, i.e., the object-image distance, is generally kept constant by using a zoom lens as an imaging lens, regardless of the image forming magnification.

When a one-to-one image of the original 1 is to be obtained, the zoom lens 3 is optically set at an almost equal distance from the original 1 and the surface of the photosensitive drum 4, as shown in FIG. 2. When an enlarged image of the original 1 is to be obtained, the zoom lens 3 is moved toward the original 1 side, and the focal length of the zoom lens 3 is changed to a value corresponding to the image forming magnification of the image, as shown in FIG. 3.

When a reduced image of the original 1 is to be obtained, the zoom lens 3 is moved toward the photosensitive drum 4, and the focal length of the zoom lens 3 is changed to a value corresponding to the image forming magnification of the image, as shown in FIG. 4.

FIGS. 5 and 6 are sectional and front views, respectively, showing a main part of a lens holding unit for holding lenses constituting the zoom lens 3.

A guide rail 9 and a cam groove plate 10 are arranged on a lens mount 7 of the copying machine. The guide rail 9 serves to guide an overall lens unit 8. The cam groove plate 10 serves to guide a cam plate 11. When an enlarged or reduced image is to be obtained, the lens unit 8 is moved by a drive source such as a motor (not shown) by a distance corresponding to a designated image forming magnification while being guided by the guide rail 9.

Cam grooves 12 and 13 are formed in a middle portion of the cam plate 11. Two protruding pins 14 protruding from lower portions of two lens barrels B are respectively coupled to the cam grooves 12 and 13. The two lens barrels B are guided by elongated holes 15 formed in the direction of the optical axis of a lens barrel A so that the lens barrels B are moved in the direction of the optical axis in accordance with the shapes of the cam grooves 12 and 13 upon movement of the cam plate 11.

The shapes of the cam grooves 12 and 13 are determined in accordance with the image forming magnification of the zoom lens 3, and the like. Lenses G2, G3, and G4, and lenses G5, G6, and G7 are respectively held/fixed in the two lens barrels B, and lenses G1 and G8 are held/fixed in the lens barrel A. A stop plate 16 for restricting a beam of light is arranged between the lens barrels B.

When the lens unit 8 is moved to a designated magnification position by the drive source while being guided by the guide rail 9, the lens barrels B move along the cam plate 11 and the cam groove plate 10 and are guided by the cam grooves 12 and 13 of the cam plate 11 to move through the lens barrel A in the direction of the optical axis, thus changing the focal length of the lens unit 8.

With this operation, a conjugate relationship is established between the surface of the original 1 and that of the photosensitive drum 4 with respect to each image forming magnification, thereby obtaining an enlarged or reduced image. The shapes of lenses G1 and G8, and those of the lenses G2 to G4, and G5 to G7 are symmetrical about the stop plate 16. In this arrangement, the two lens barrels B are assembled in the lens barrel A such that one of the lens barrels B is reversed laterally with respect to the other.

With a reduction in space for a copying machine, demands have recently arisen for a zoom lens which can realize a reduction in the size of the overall lens system and an increase in field angle. In addition, with an improvement in the performance of a copying machine, demands have arisen for a high-magnification, high-performance lens system.

In general, in order to realize a zoom lens which can satisfy such demands, various requirements must be satisfied. For example, in order to reduce the size of the lens system, the refracting power of each lens group must be increased. In order to properly compensate for the optical performance, the processing precision of each lens, the processing precision of each lens barrel, and the like must be increased. If, for example, the processing precision of each lens is insufficient, the focal length of the overall lens system varies because of variations in the lens surface precision, the lens thickness, and the refractive index of a lens material, thus increasing various aberrations, e.g., a curvature of field. As a result, the image formation performance cannot be properly maintained throughout the variable magnification range and the image plane.

The lens barrel structure of a zoom lens used for a copying machine is constituted by a lens system which is symmetrical about a stop. As shown in FIG. 5, part of the lens barrel structure is laterally symmetrical.

For this reason, if the axial position of the lens holding portion of the lens barrel is offset from the central axis of the guide portion of a moving lens barrel by a distance Δx, as shown in FIG. 7, an aberration caused at the front group is increased, resulting in a considerable deterioration in image formation performance.

Assume that the height of a lens unit is decreased by reducing the thickness of a lens barrel portion in order to realize a reduction in the size of the overall lens system with a reduction in space for a copying machine. In this case, the lens barrel is deformed by a pressure applied upon mounting of a lens press ring, or a shock produced in an assembly operation. As a result, the lens groups are inclined to cause an asymmetrical curvature of field, thus deteriorating image formation performance.

The arrangement for directly pressing a lens to adjust the lens position in the lens barrel especially produces strain in the lens barrel and the lens. As a result, the holding position and the optical axis of the lens are decentered to greatly deteriorate optical performance.

SUMMARY OF THE INVENTION

It is the first object of the present invention to provide an image pickup apparatus such as a copying machine having an adjustment mechanism suitable for a zoom lens unit, which can realize a reduction in the size of the overall lens system and an increase in the magnification of the lens system, while good optical characteristics of the lens system with respect to the overall image plane are maintained, by properly setting an adjustment mechanism and the like for adjusting optical characteristics which vary owing to a lens arrangement, manufacturing errors, assembly errors, and the like.

It is the second object of the present invention to provide a lens holding unit which can properly adjust optical characteristics associated with curvatures of field, tilt of image plane, and the like to increase the tolerance of the processing precision of each lens barrel and each lens, which are to realize high performance, by properly arranging a lens barrel structure for moving lens groups along the optical axis and an adjustment mechanism for adjusting the optical positions of predetermined lens groups.

An image pickup apparatus having an adjustment mechanism according to the present invention is characterized in that a first group having a negative refracting power, a second group having a positive refracting power, a stop, a third group having a positive refracting power, and a fourth group having a negative refracting power are sequentially arranged from the object side to be substantially symmetrical about the stop, an image forming magnification is changed, while an object-image distance is kept constant, by moving the overall lens system and moving the second and third groups on an optical axis, and image formation characteristics of the overall lens system are adjusted by moving and/or decentering the first group and/or the fourth group on/from the optical axis.

The adjustment mechanism is especially characterized in that the first group and/or the fourth group is pivoted about a principal point of the lens groups as a rotational axis.

In addition, an image pickup apparatus having an adjustment mechanism according to the present invention is characterized in that lens barrels for respectively holding a plurality of lens groups constituting an imaging lens are arranged to be substantially symmetrical about a stop, the lens barrels are guided or positioned by a plurality of guide members having central axes at points other than an optical axis of the imaging lens when an image forming magnification is changed by moving the imaging lens on the optical axis while an object-image distance is kept constant, and an adjustment mechanism for adjusting the positions of some of the lens barrels in a direction of the optical axis, and an adjustment mechanism for performing angle adjustment with resect to the optical axis are arranged near the guide members.

Especially at least one pair of guide members of the plurality of guide members are arranged on both sides of the optical axis.

Furthermore, an image pickup apparatus having an adjustment mechanism according to the present invention is characterized in that a plurality of lens barrels for respectively holding a plurality of lens groups constituting an imaging lens are arranged to be substantially symmetrical about a stop, and a plurality of guide members are arranged on both sides of an optical axis of the imaging lens to be parallel thereto, so that when an image forming magnification is changed by moving the imaging lens on the optical axis while an object-image distance is kept constant, the plurality of lens barrels are moved along the plurality of guide members.

Especially the imaging lens forms an image of an object, illuminated with light through a slit, on a predetermined plane, and the plurality of guide members are arranged on both sides of the optical axis of the imaging lens in the longitudinal direction of the slit so as to be parallel to the optical axis.

DETAILED DESCRIPTION OF THE PREFERRED EMBODIMENTS

Figure 1:
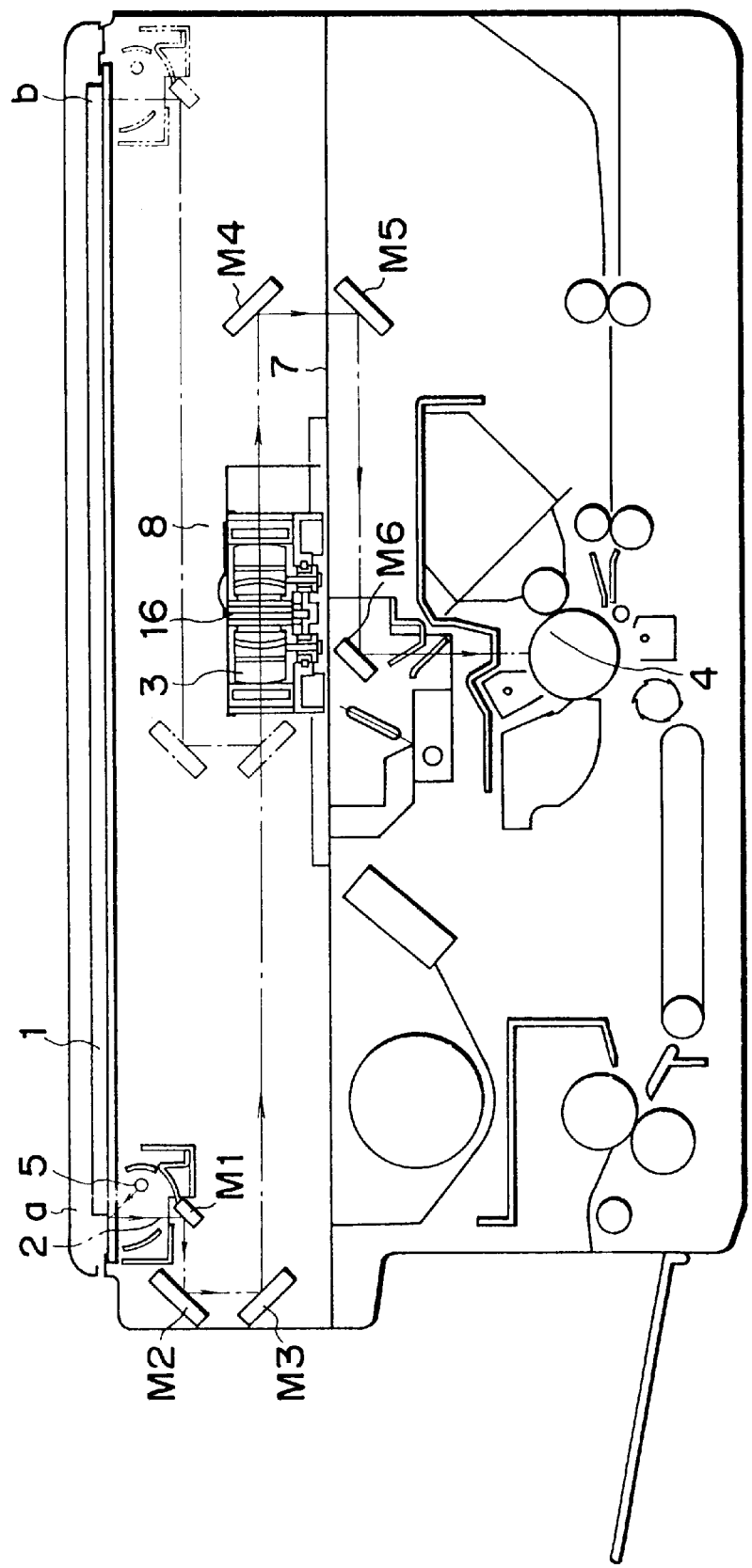
FIG. 1 is a sectional view showing a main part of a conventional electrophotographic copying machine of a slit exposure scheme.
Figure 2:
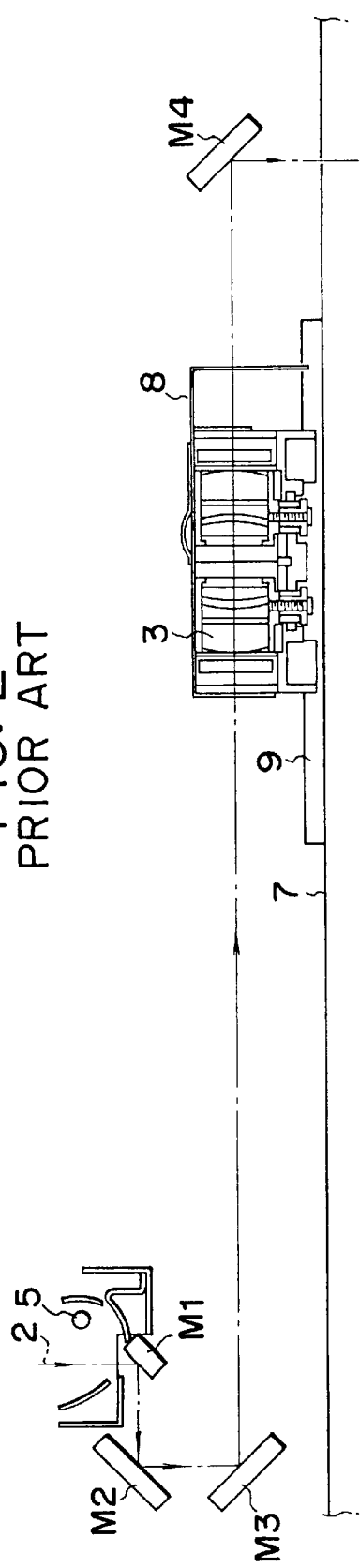
FIG. 2 is a side view showing a portion of the structure in FIG. 1.
Figure 3:
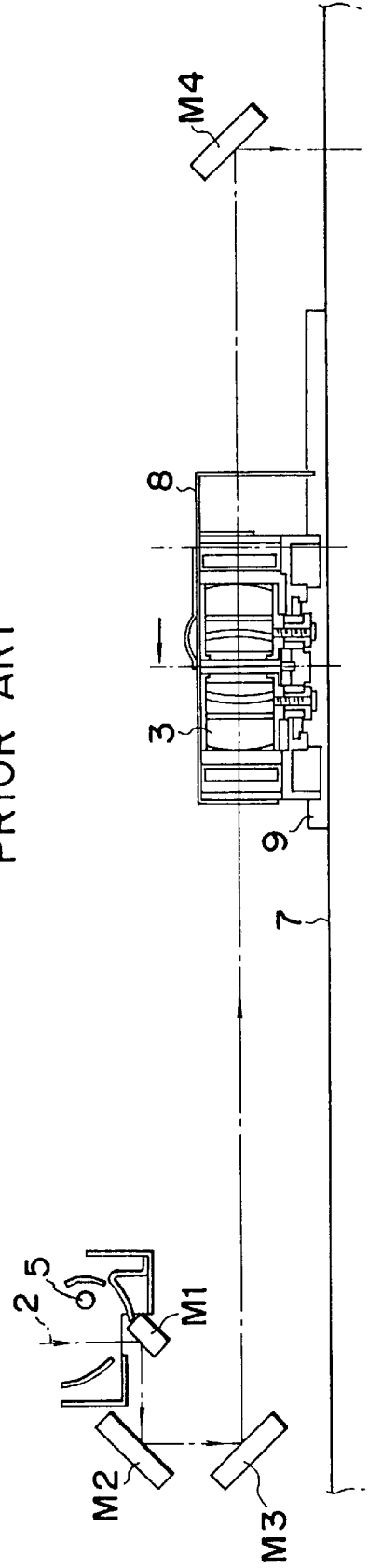
FIG. 3 is a side view showing a portion of the structure in FIG. 1.
Figure 4:
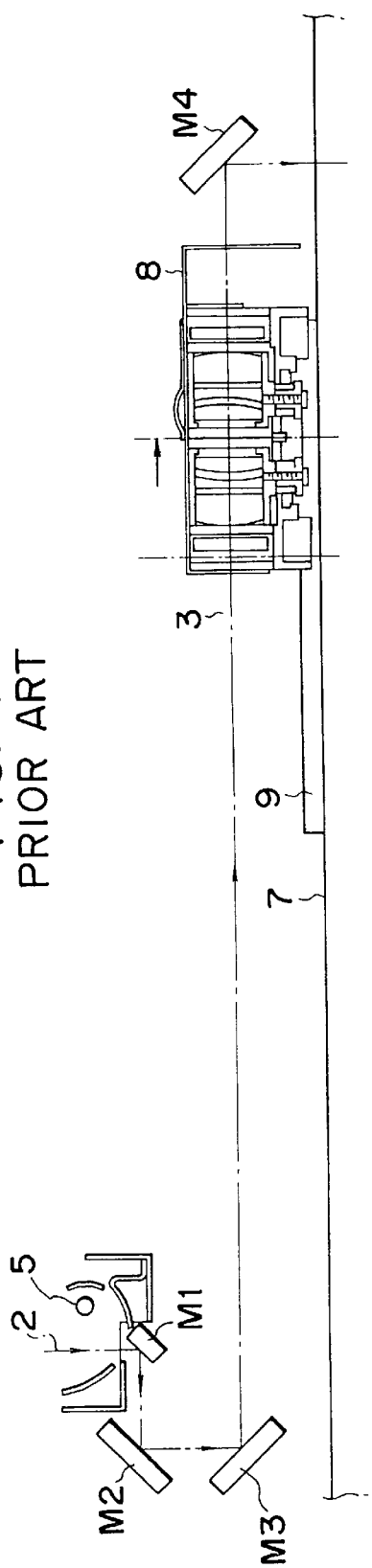
FIG. 4 is a side view showing a portion of the structure in FIG. 1.
Figure 5:
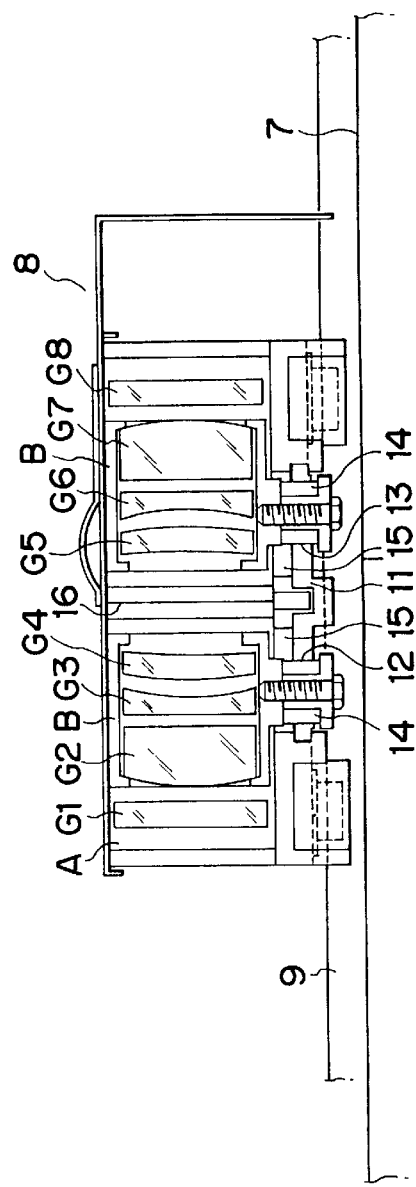
FIG. 5 is a sectional view showing a portion of the structure in FIG. 1.
Figure 6:
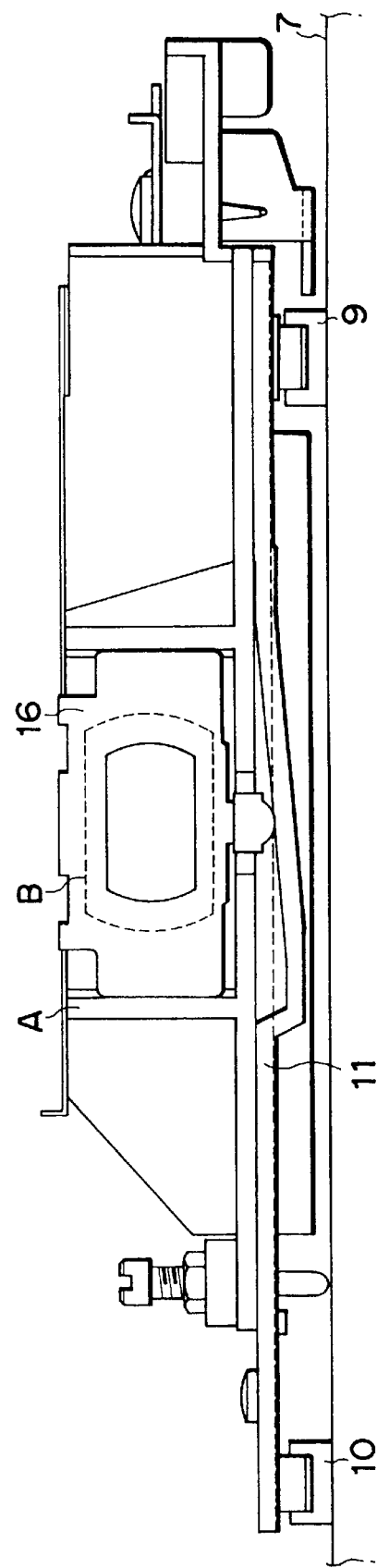
FIG. 6 is a front view showing a portion of the structure in FIG. 1.
Figure 7A:
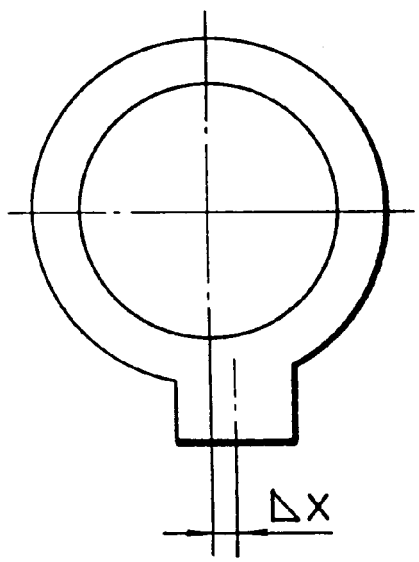
FIG. 7 is a sectional view showing a portion of the structure in FIG. 1.
Figure 7B:
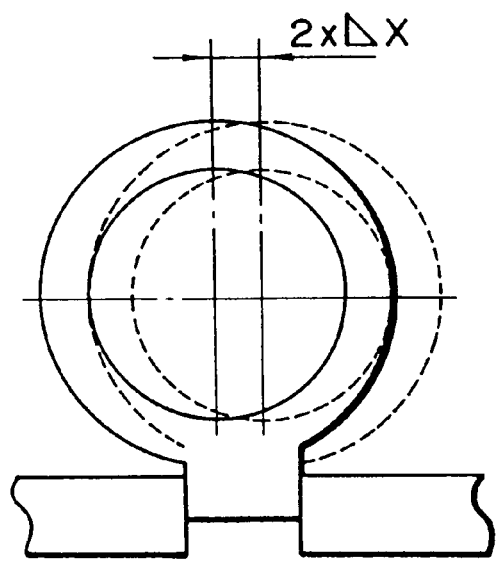
Figure 8:
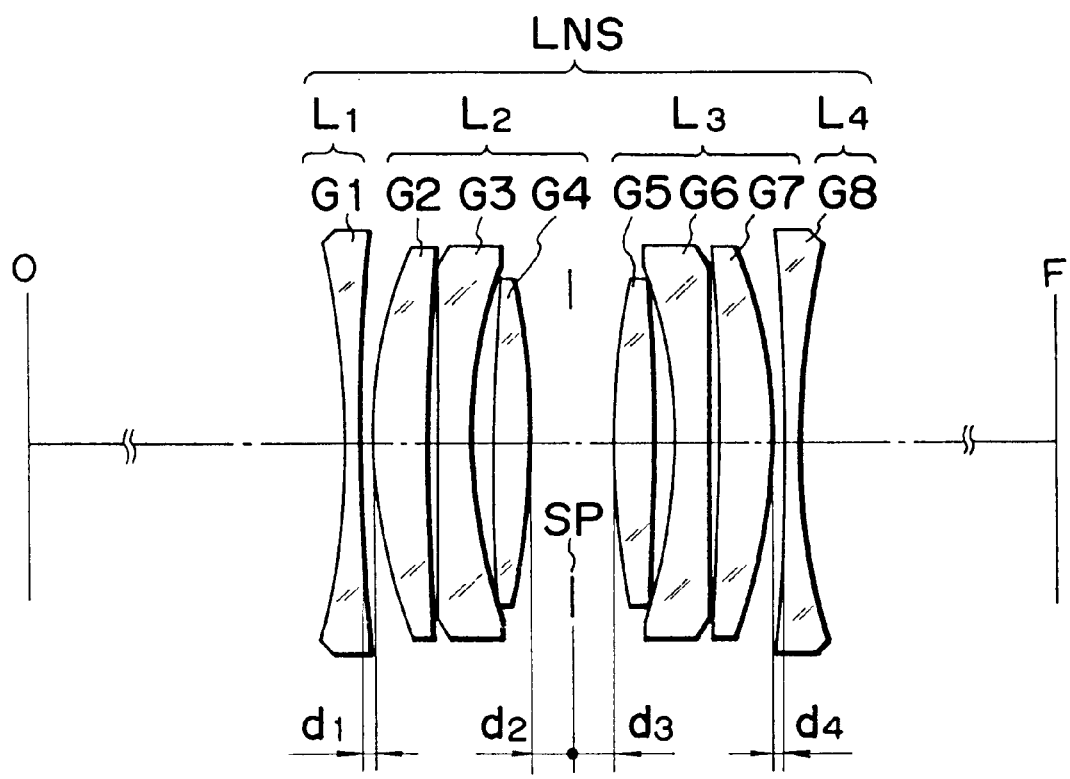
FIG. 8 is a sectional view showing a main part of an imaging lens of the first embodiment of an image pickup apparatus having an adjustment mechanism according to the present invention.

FIG. 8 is a sectional view showing a main part of an imaging lens LNS used for an image pickup apparatus having an adjustment mechanism according to the present invention. FIG. 8 shows an object O such as an original surface, and an image plane (image formation plane) F of a photosensitive drum or the like. The imaging lens LNS includes a first group L1, a second group L2, a stop SP, a third group L3, and a fourth group L4. The first group L1 is a stationary group having a negative refracting power. The first group L1 is constituted by one negative lens G11. The second group L2 is a movable group having a positive refracting power. The second group L2 is constituted by three lenses, i.e., a positive lens G2, a negative lens G3, and a positive lens G4. The third group L3 is a movable group having a positive refracting power. The third group L3 is constituted by three lenses, i.e., a positive lens G5, a negative lens G6, and a positive lens G7. The fourth group L4 is a stationary group having a negative refracting power. The fourth group L4 is constituted by one negative lens GB.

The imaging lens LNS of this embodiment is constituted by a lens arrangement having right and left portions which are symmetrical about the stop SP. When the focal length of the overall system is continuously changed to change the image forming magnification, the overall lens system is moved on the optical axis while moving the second and third groups L2 and L3 as movable groups on the optical axis, i.e., changing air gaps d1, d2, d3, and d4.

A numerical embodiment of the imaging lens in FIG. 8, i.e., a numerical embodiment of the imaging lens LNS according to the present invention, is shown below. In this numerical embodiment, Ri is the curvature radius of the surface of the i-th lens from the object side, Di is the lens thickness and air gap of the i-th lens from the object side, and Ni and $v1$ are the refractive index and Abbe number of the i-th lens glass from the object side, respectively.

| | | | |
|---|---|---|---|
| R1 = −63.49 | D1 = 1.36 | N1 = 1.60729 | ν1 = 49.2 |
| R2 = 207.09 | D2 = 0.59 | | |
| R3 = 37.03 | D3 = 3.93 | N2 = 1.80610 | ν2 = 41.0 |
| R4 = 280.15 | D4 = 0.36 | | |
| R5 = −753.65 | D5 = 2.29 | N3 = 1.83400 | ν3 = 37.2 |
| R6 = 39.45 | D6 = 1.43 | | |
| R7 = 281.36 | D7 = 2.49 | N4 = 1.77250 | ν4 = 49.6 |
| R8 = −52.92 | D8 = 2.77 | | |
| R9 = 0 | D9 = 2.77 | | |
| R10 = 52.92 | D10 = 2.49 | N5 = 1.77250 | ν5 = 49.6 |
| R11 = −281.36 | D11 = 1.43 | | |
| R12 = −39.45 | D2 = 2.29 | N6 = 1.83400 | ν6 = 37.2 |
| R13 = 753.65 | D3 = 0.36 | | |
| R14 = −280.15 | D4 = 3.93 | N7 = 1.80610 | ν7 = 41.0 |
| R15 = −37.03 | D5 = 0.59 | | |
| R16 = −207.09 | D6 = 1.36 | N8 = 1.60729 | ν8 = 49.2 |
| R17 = 63.49 | | | |

Focal length of overall system = 195.4 mm
Total length = 30.4 mm

In the embodiment, in order to realize both a reduction in the size of the imaging lens LNS and an increase in the magnification thereof, the moving amounts of the second and third groups L2 and L3 for variable magnification must be decreased. For this purpose, in the embodiment, the refracting power of each of the lens groups L1 and L4 is set to be high.

For this reason, very high processing precision is required for each lens and each lens barrel. For example, manufacturing errors in the lens surface precision, the lens thickness processing precision, and the refractive index of a lens material cause a symmetrical aberration with respect to the optical axis on an image formation plane, resulting in a considerable deterioration in image formation performance. The curvature of field is especially increased, and a great reduction in resolving power occurs at a peripheral portion of the image plane.

This phenomenon will be described next with reference to FIGS. 9 and 10.

Figure 9:
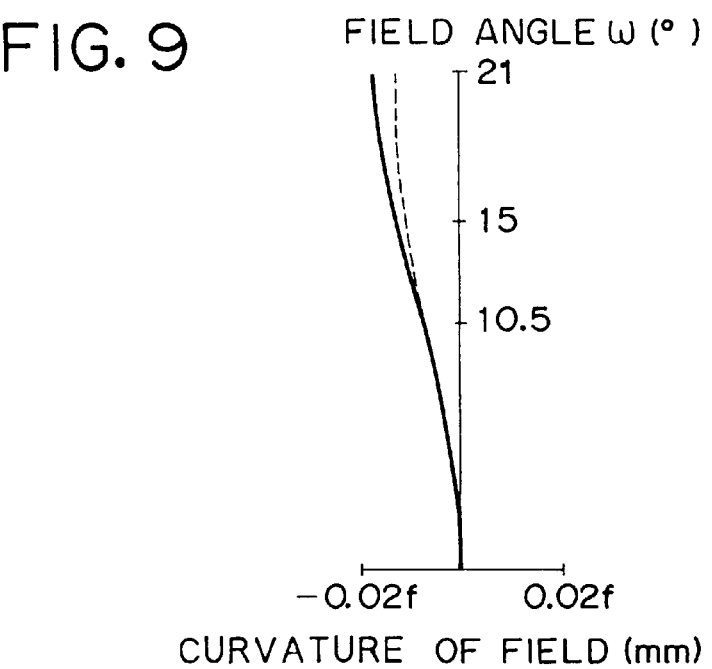
FIG. 9 is a graph showing the curvature of field of the imaging lens according to the present invention.

FIG. 9 is a graph showing the curvature of field at an equal magnification as the standard magnification of the zoom lens according to the present invention. Referring to FIG. 9, the ordinate indicates a field angle ω, and the abscissa indicates a curvature of field. The solid and broken curves in FIG. 9 indicate curvatures of field at a sagittal plane and at a meridional plane, respectively. If no manufacturing error occurs in the above-mentioned processing precision, the lens system exhibits good optical performance throughout the image plane, as shown in FIG. 9.

If, however, the above-mention processing error occurs, the curvature of field at a peripheral portion of the image plane at which the field angle is increased, especially the meridional plane, is increased, resulting in a great deterioration in image formation performance. In this case, the problem can be solved by strictly suppressing the processing error. However, such an operation is very difficult to perform in consideration of manufacturing process performance, cost, and the like.

In the embodiment, a deterioration of image formation performance is prevented by arranging an adjustment mechanism for adjusting the curvature of field in at least one of the lens groups L1 and L4 as stationary groups.

The adjustment mechanism will be described in detail below with reference to FIGS. 11 to 13.

Figure 11:
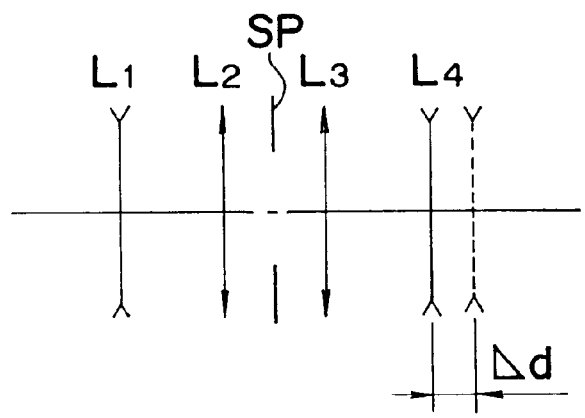
FIG. 11 is a schematic view of a main part of the imaging lens according to the present invention.

FIG. 11 shows a schematic representation of the imaging lens LNS in FIG. 8. FIG. 11 shows a case wherein an adjustment mechanism for correcting the curvature of field is arranged at the fourth group L4 as a stationary group on the image plane side to perform adjustment of the curvature of field. That is, the adjustment mechanism adjusts the distance from the adjacent third group L3 in the direction of the optical axis.

Figure 12:
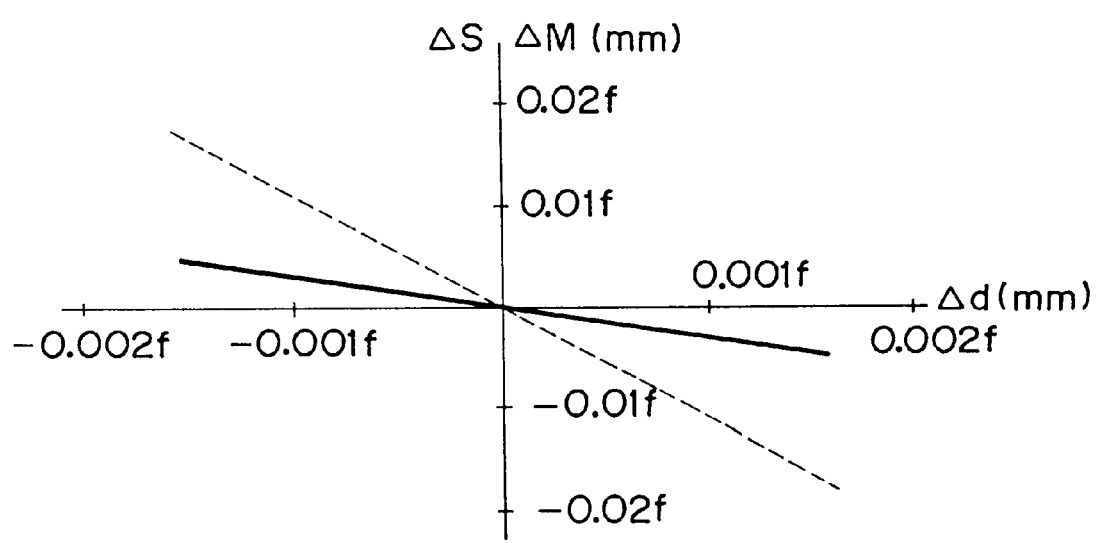
FIG. 12 is a graph for explaining the correction amount of the curvature of field for the imaging lens.

FIG. 12 shows the correction amount of the curvature of field in a case wherein the fourth group L4 is adjusted by a distance Δd in FIG. 11. Referring to FIG. 12, the abscissa indicates the moving amount Δd of the fourth group L4, and the ordinate indicates the correction amount (ΔS for the sagittal plane, ΔM for the meridional plane) of the curvature of field at the maximum field of angle of an equal magnification as the standard magnification. The solid and broken curves in FIG. 12 indicate the correction amounts at the sagittal plane and at the meridional plane, respectively.

As is apparent from FIG. 12, the curvatures of field, especially the curvature of field at the meridional plane, are corrected by adjusting (changing) the distance between the fourth group L4 as a stationary group and the adjacent third group L3 as a movable group in the direction of the optical axis.

Figure 10:
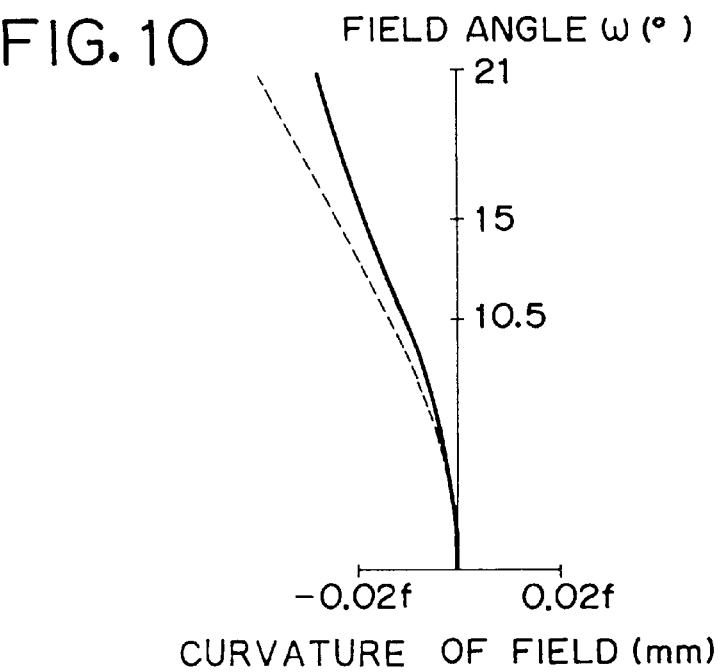
FIG. 10 is a graph showing the curvature of field of the imaging lens according to the present invention.
Figure 13:
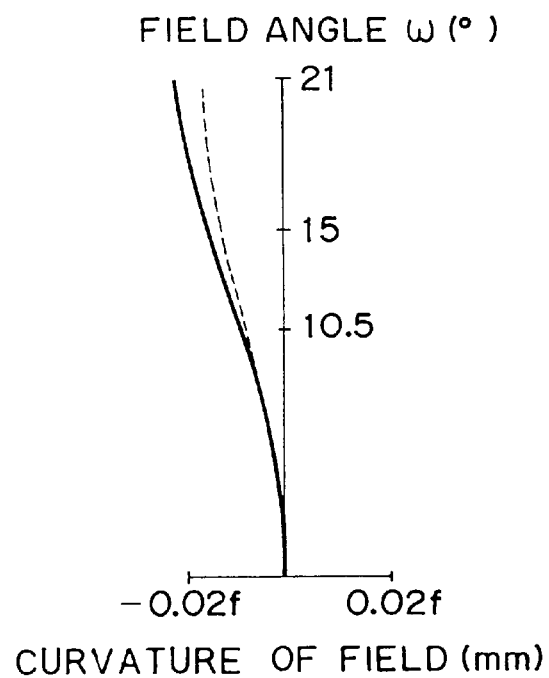
FIG. 13 is a graph showing the curvature of field of the imaging lens.

FIG. 13 shows the curvature of field adjusted by moving the fourth group L4 in FIG. 10. As is apparent from FIG. 13, the curvature of field is sufficiently corrected, and good image formation performance is obtained as compared with the case shown in FIG. 9.

In the embodiment, the adjustment mechanism is arranged at the fourth group L4 on the image plane side. However, the same effects can be obtained even if an adjustment mechanism is arranged at the first group L1 as a stationary group on the object side to adjust the distance from the second group L2 as a movable group in the direction of the optical axis.

Figure 14:
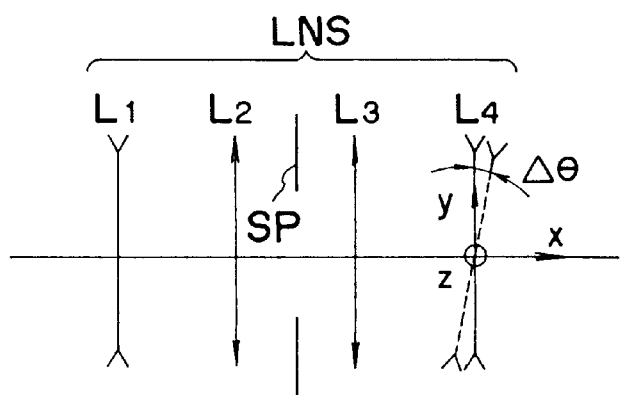
FIG. 14 is a schematic view of a main part of an imaging lens of the second embodiment of the image pickup apparatus having the adjustment mechanism according to the present invention.

FIG. 14 shows a schematic representation of an imaging lens LNS as the second embodiment of the image pickup apparatus having the adjustment mechanism according to the present invention.

In general, if a lens is decentered from the optical axis because of decentering of a lens itself, a backlash of a lens barrel, or the like, an aberration which is asymmetrical about the optical axis is caused, resulting in a considerable deterioration in image formation performance. For example, the image plane is inclined such that the focal position on the near side of the image plane shifts in the optical axis from that on the far side. That is, a so-called tilt of image plane may occur.

Figure 15:
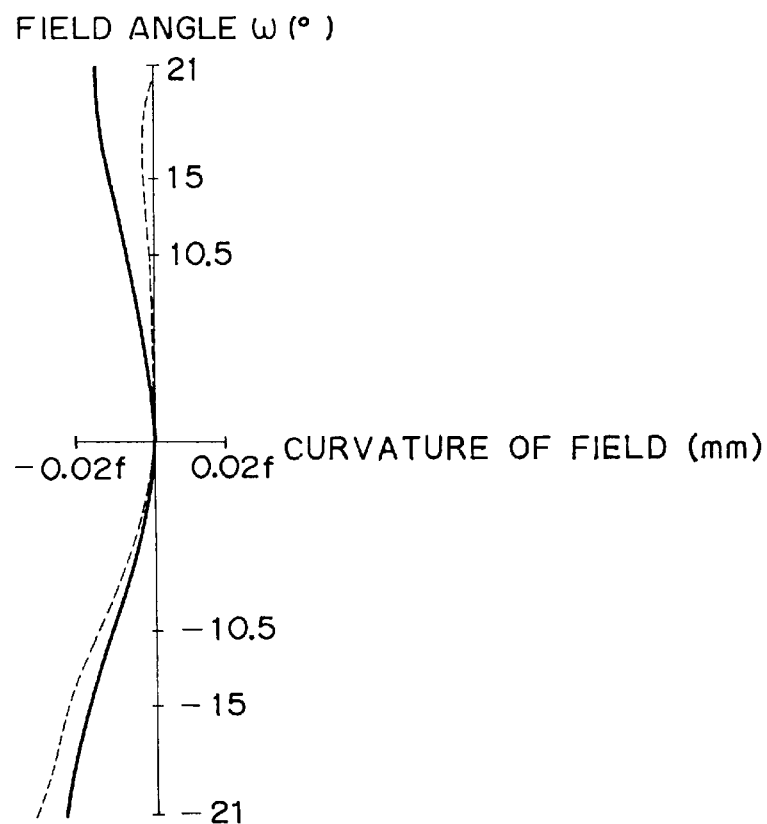
FIG. 15 is a graph showing the curvature of field of the imaging lens according to the present invention.
Figure 16:
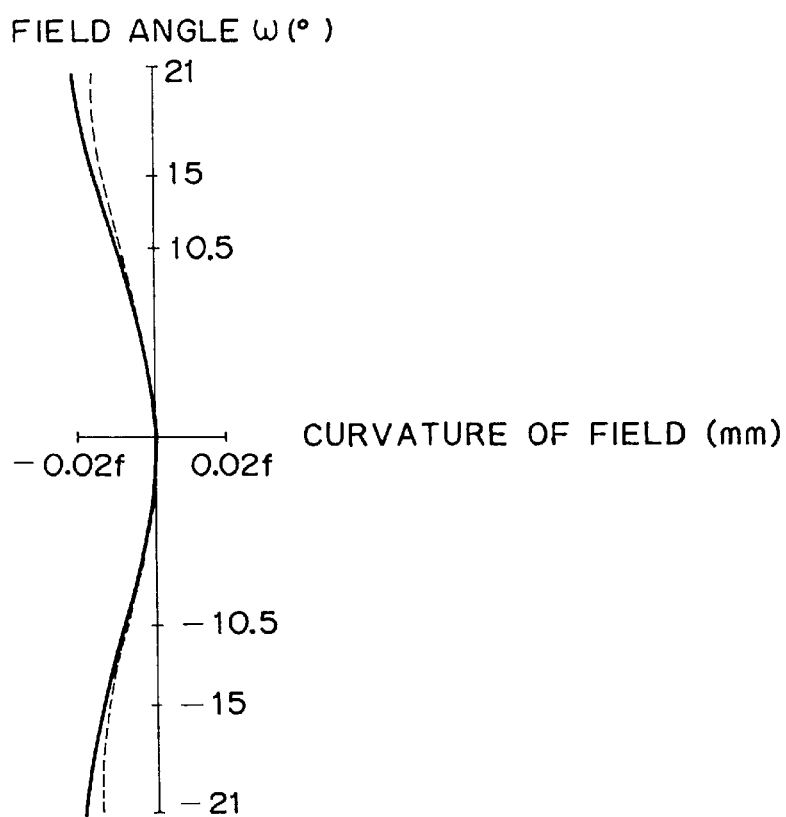
FIG. 16 is a graph showing the curvature of field of the imaging lens according to the present invention.

FIGS. 15 and 16 are graphs for explaining the curvature of field. In each of the graphs, the ordinate indicates a field angle ω; the sign "+", the far side of the image plane; the sign "−", the near side of the image plane; the abscissa, the curvature of field; the solid curve, the curvature of field at a sagittal plane; and the broken curve, the curvature of field at a meridional plane. In the case shown in FIG. 15, since a tilt of image plane is large at the meridional plane, the focal position shifts to the minus side on the near side of the image plane, and also shifts to the plus side on the far side of the image plane.

As described above, if there is a tilt of image plane, the image formation performance cannot be properly compensated throughout the image plane.

In this embodiment, therefore, an adjustment mechanism for tilt of image plane is arranged at a fourth group L4 as a stationary group to adjust the angle of the fourth group L4 with respect to an ideal optical axis x of the zoom lens, as shown in FIG. 14.

Referring to FIG. 14, the fourth group L4 is rotated by an angle Δθ with respect to the ideal optical axis x about a rotational axis z which is perpendicular to the meridional plane and passes through the optical axis of the fourth group L4 (i.e., passing through a principal point of the fourth group L4 within the sagittal plane), thereby performing correction of the tilt of image plane.

Figure 17:
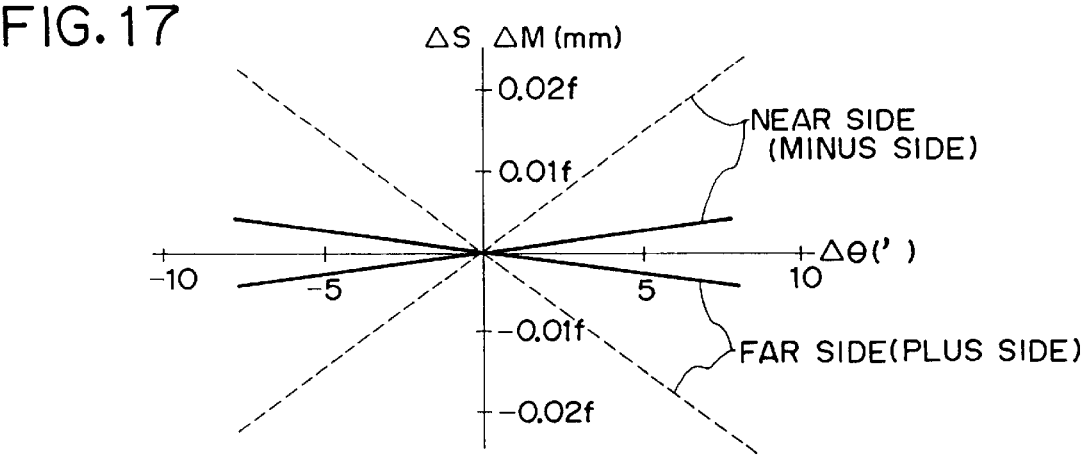
FIG. 17 is a graph for explaining the correction amount of the curvature of field for the imaging lens according to the present invention.

FIG. 17 shows the correction amount ($\Delta M, \Delta S$) for the tilt of image plane in a case wherein the fourth group L4 is rotated through the angle $\Delta\theta$. Referring to FIG. 17, the abscissa indicates the rotational angle $\Delta\theta$; the ordinate, the correction amount ($\Delta M, \Delta S$) for the tilt of image plane; the solid curve, the correction amount at the sagittal plane at the maximum field angle; and the broken curve, the correction amount at the meridional plane at the maximum field angle.

Since the fourth group L4 is rotated about the axis passing through the optical axis, the correction amounts on the near and far sides are expressed with the opposite signs but are equal in absolute value. That is, only the tilt of image plane is corrected without any influence on the curvature of field.

FIG. 16 shows the curvature of field obtained when a tilt of image plane is corrected by rotating the fourth group L4 as a stationary group. As is apparent from FIG. 16, the zoom lens exhibits good image formation performance throughout the image plane.

In this embodiment, the adjustment mechanism is provided at the fourth group L4 on the image plane side. However, the same effects can be obtained even if an adjustment mechanism for adjusting the angle with respect to the ideal optical axis x of the zoom lens is provided at the first group L1 as a stationary group on the object side.

In the embodiment, the description is associated with a tilt of image plane on the meridional plane. However, correction at the sagittal plane can be performed by using the y-axis in FIG. 14 as a rotational axis.

In the embodiment, correction for curvature of field and correction for tilt of image plane are separately described. However, as shown in FIG. 18, the two adjustment mechanisms may be arranged at either the first group L1 or the fourth group L4, each serving as a stationary group.

Figure 18:
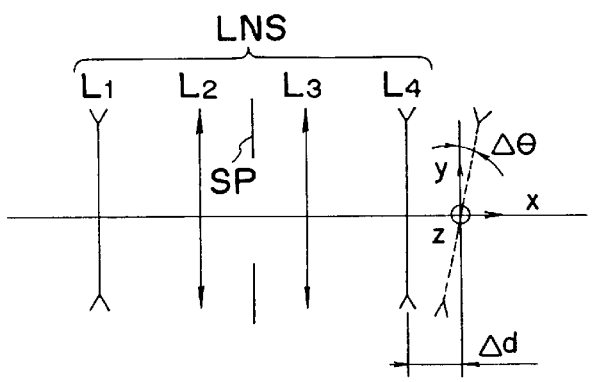
FIG. 18 is a schematic view of an imaging lens of the third embodiment of the image pickup apparatus having the adjustment mechanism according to the present invention.

FIG. 18 shows a schematic representation of an imaging lens LNS as the third embodiment of the image pickup apparatus having the adjustment mechanism according to the present invention.

In this embodiment, an adjustment mechanism for tilt of image plane and a curvature of field adjustment mechanism are provided at one stationary group (fourth group L4). With this construction, the same effects as those obtained by the first and second embodiments are obtained. In this case, since a tilt of image plane and a curvature of field can be adjusted by one lens group, adjustment mechanisms and adjustment methods can be simplified. In this case, a rotational axis for correcting a tilt of image plane need not pass through the optical axis of the lens group. Assume that the rotational axis is located outside the optical axis of the lens group. In this case, although the adjustment for tilt of image plane can be performed by rotating the lens group, the curvature of field also changes at the same time. In the embodiment, however, both a tilt of image plane and a curvature of field can be corrected because the lens group also has the curvature of field adjustment mechanism.

Figure 19:
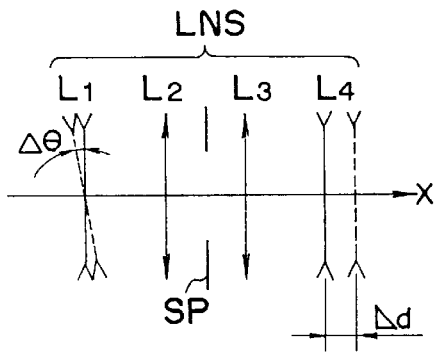
FIG. 19 is a schematic view of an imaging lens of the fourth embodiment of the image pickup apparatus having the adjustment mechanism according to the present invention.

FIG. 19 shows a schematic representation of an imaging lens LNS as the fourth embodiment of the image pickup apparatus having the adjustment mechanism according to the present invention.

In this embodiment, an adjustment mechanism for tilt of image plane is provided at one stationary lens group (first group L1), and a curvature of field adjustment mechanism is arranged at the other stationary lens group (fourth group L4). With this construction, the same effects as those obtained by the first and second embodiments are obtained. In this case, since a tilt of image plane and a curvature of field can be separately adjusted, adjustment mechanisms and adjustment methods can be simplified.

As described above, in the first to fourth embodiments, an adjustment mechanism for adjusting image formation performance associated with the curvatures of field, tilt of image plane, and the like is provided at least at one of the two stationary lens groups, i.e., the first and fourth groups. With this construction, the tolerance of processing precision of a lens or a lens barrel can be increased, thereby easily realizing a reduction in the size of a zoom lens and an increase in the magnification thereof.

Figure 20:
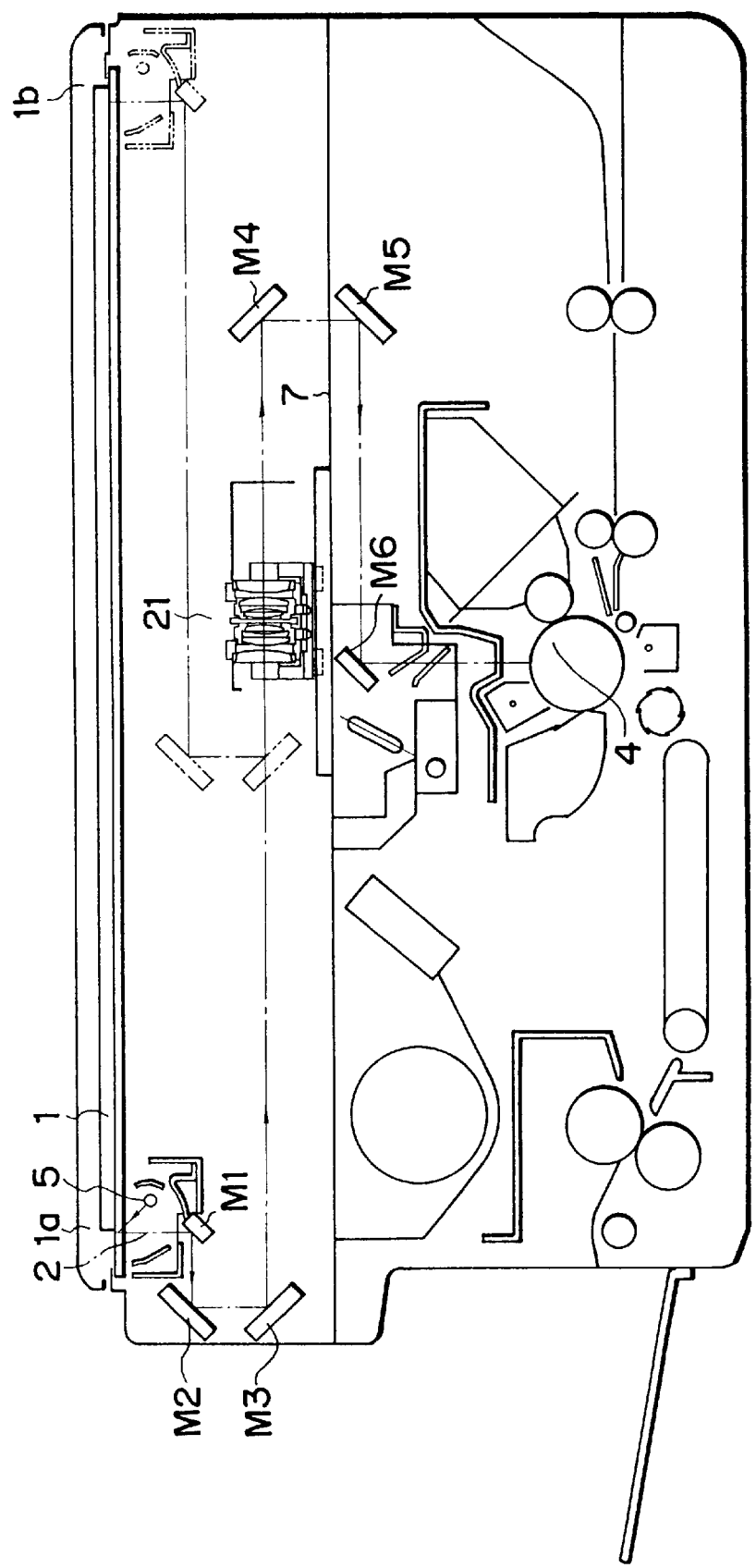
FIG. 20 is a sectional view of a main part of the first embodiment of a lens holding unit according to the present invention.

FIG. 20 is a sectional view showing a main part of the first embodiment in which a lens holding unit of the present invention is applied to an electrophotographic copying machine of a slit exposure scheme.

Referring to FIG. 20, the surface of an original 1 is illuminated with a beam of light from a light source 5 through a slit. A beam 2 from the original 1 is reflected by mirrors M1, M2, and M3 and is caused to be incident on a photosensitive drum 4 by a zoom lens 21 as an imaging lens through mirrors M4, M5, and M6. With this operation, original images are formed on the surface of the photosensitive drum 4 at various image forming magnifications.

The zoom lens 21 in this embodiment is constituted by the same lens arrangement as that shown in FIG. 8. An adjustment mechanism is provided on the fourth group as a stationary group. The fourth group is moved in the direction of the optical axis, and is decentered from the optical axis as needed, thereby adjusting various optical characteristics. The original 1 is sequentially moved/scanned, from an end portion 1a to an end portion 1b, at the same speed. Thereafter, an original image formed on the photosensitive drum 4 by a known electrophotographic process is developed. The developed image is then transferred onto a transfer sheet, thus visualizing the image.

Figure 21:
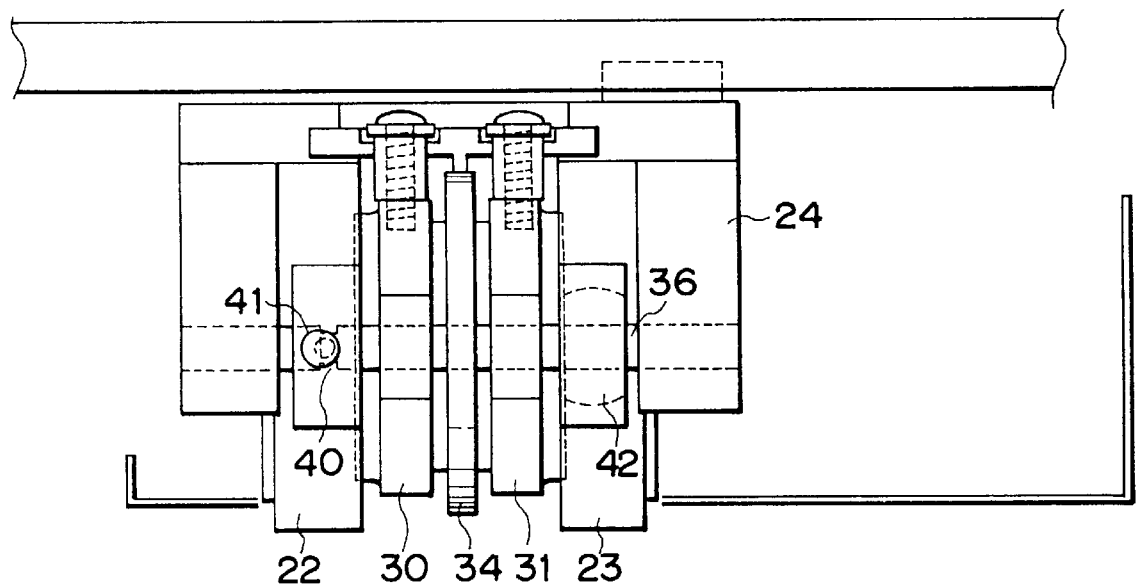
FIG. 21 is a side view of a main part of the first embodiment in FIG. 20.
Figure 22:
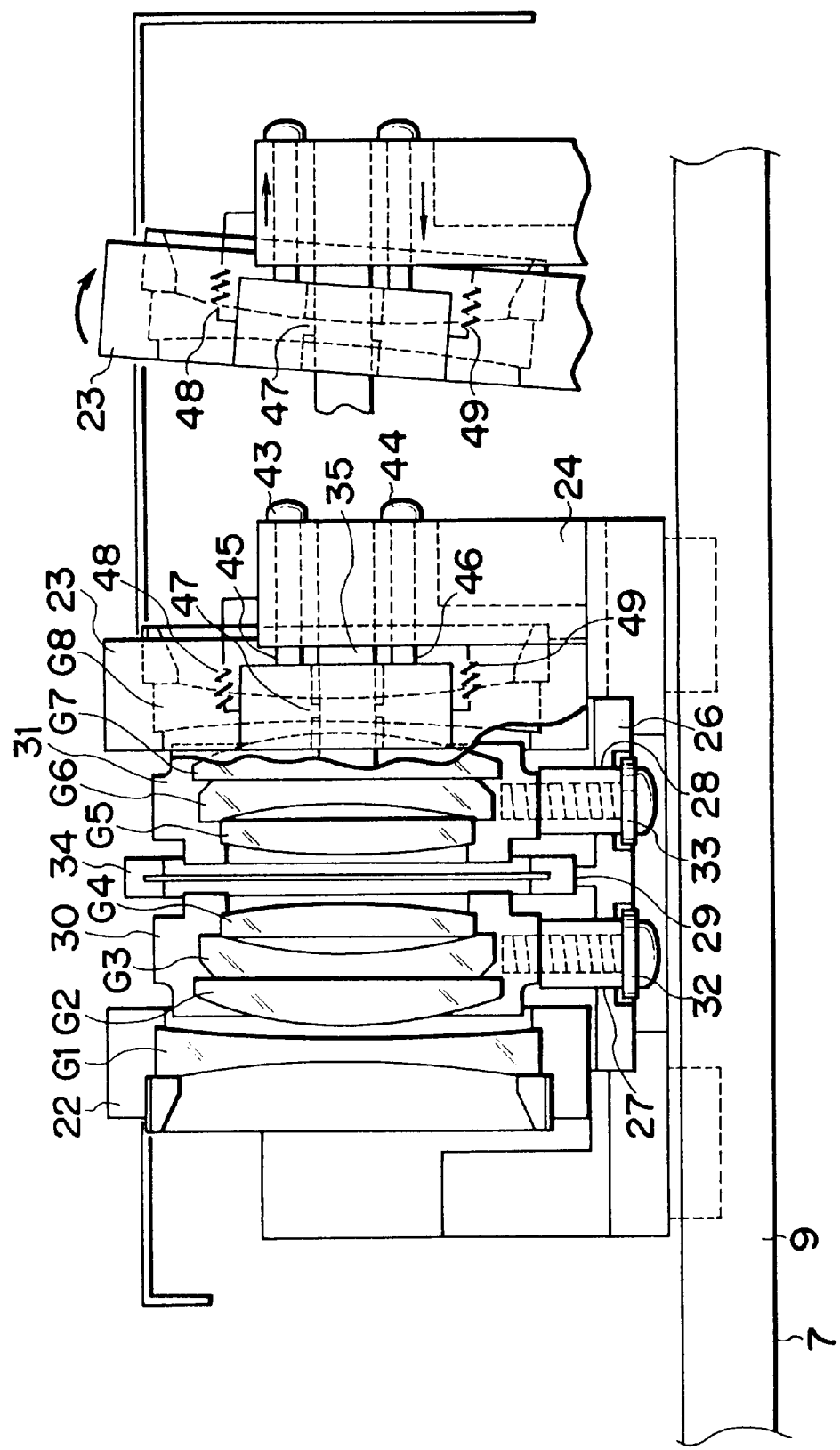
FIG. 22 is a sectional view of a main part of the first embodiment in FIG. 20.
Figure 23:
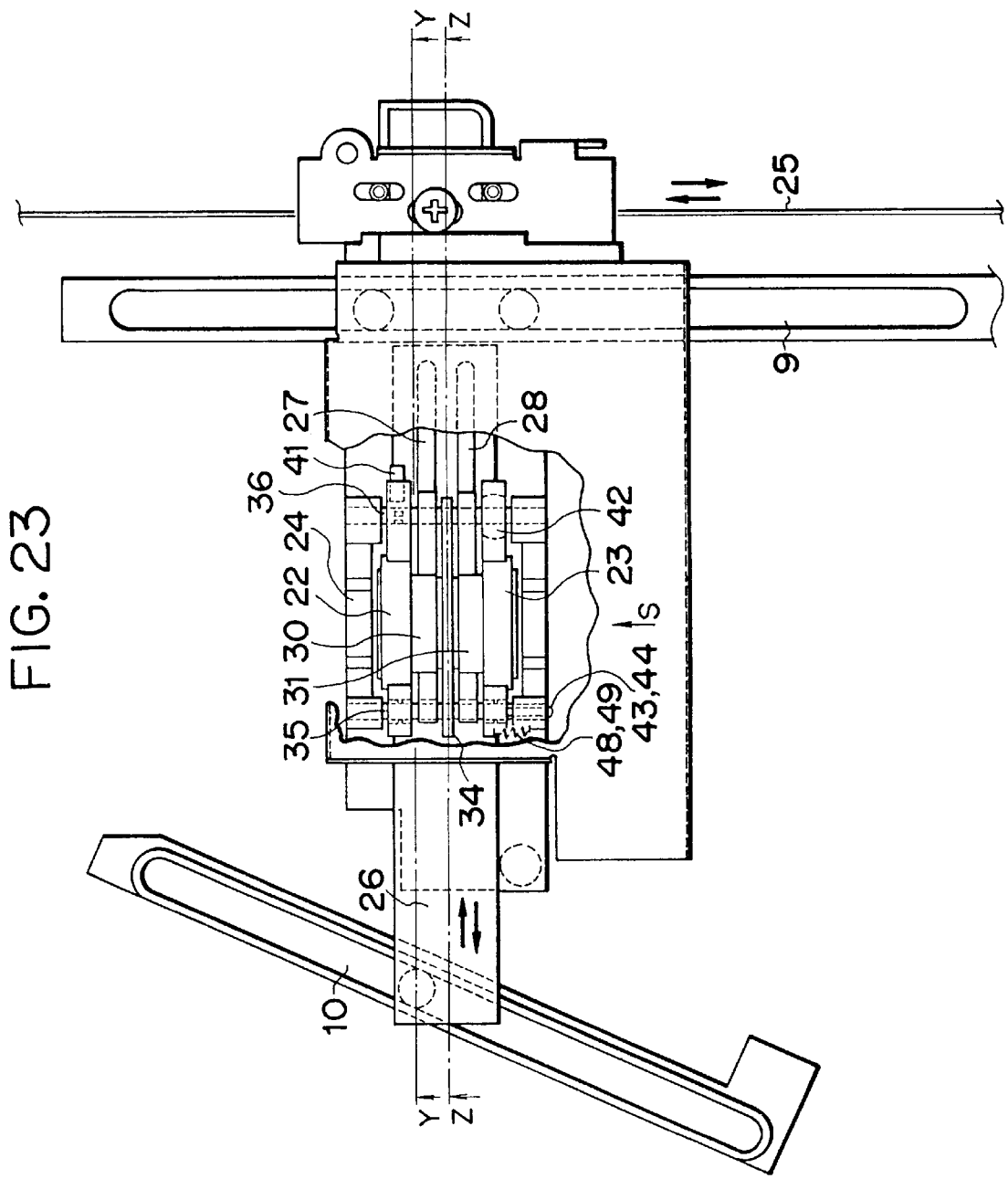
FIG. 23 is a plan view of a main part of the first embodiment in FIG. 20.
Figure 24:
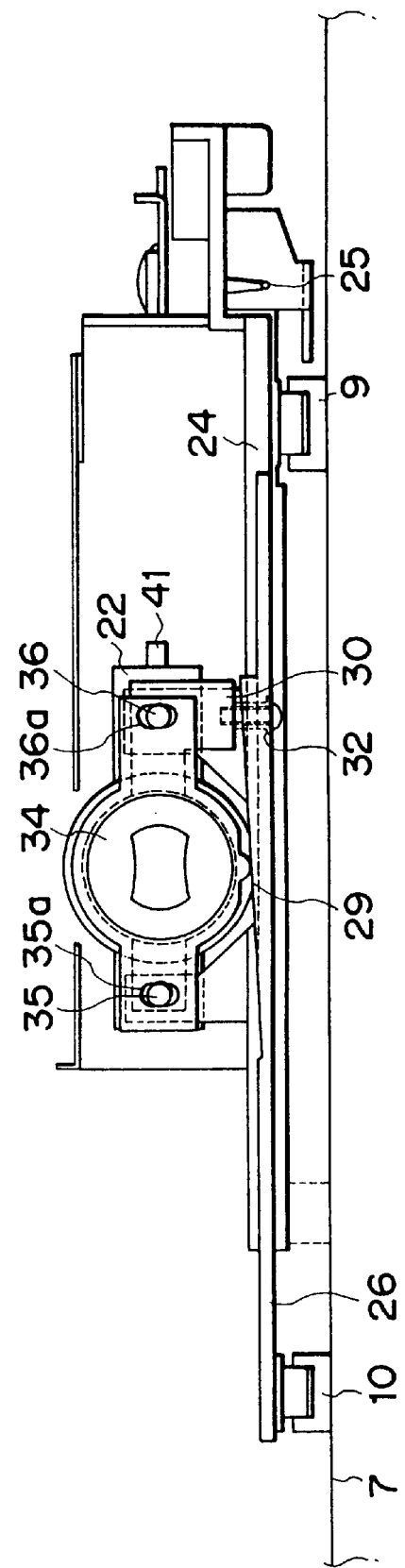
FIG. 24 is a sectional view taken along a line Z—Z in FIG. 23.
Figure 25:
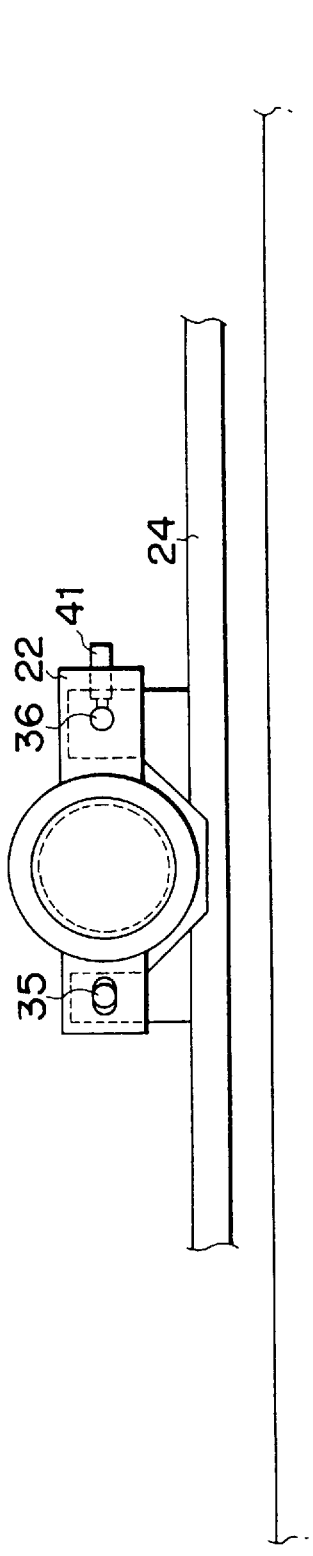
FIG. 25 is a sectional view taken along a line Y—Y in FIG. 23.
Figure 26:
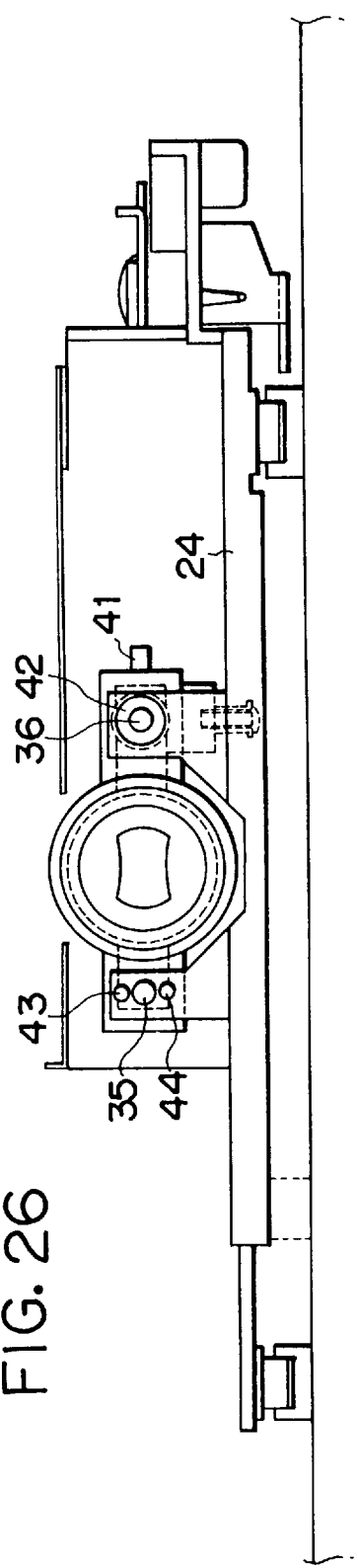
FIG. 26 is a view taken in the direction of an arrow S in FIG. 23.

FIG. 21 is a side view of the zoom lens 21 in FIG. 20. FIG. 22 is a sectional view of the zoom lens 21 in FIG. 20, to which a partial front view of the zoom lens 21 is added. FIG. 23 is a plan view of the zoom lens 21 in FIG. 20. FIG. 24 is a sectional view taken along a line Z—Z in FIG. 23. FIG. 25 is a sectional view taken along a line Y—Y in FIG. 23. FIG. 26 is a view taken in the direction of an arrow S in FIG. 23.

The construction of this embodiment will be described next with reference to FIGS. 21 to 26.

The zoom lens 21 includes stationary lens barrels 22 and 23 (lens barrels). Lenses G1 and G8 are respectively assembled in the stationary lens barrels 22 and 23 and are supported by guide shafts 35 and 36 serving as guide members parallel to the optical axis. Each of the guide shafts 35 and 36 is supported on a lens barrel base 24 at two ends. A round hole 36a and an elongated hole 35a are respectively formed in one end and the other end of the stationary lens barrel 22. The guide shaft 36 is adapted to be fitted into the round hole 36a. The elongated hole 35a has a long side which is in contact with the guide shaft 35. With this construction, the stationary lens barrel 22 is supported on the lens barrel base 24 so as to be freely moved in the axial direction of the shafts 35 and 36. A decentering pin 41 is provided in the round hole 36a. The distal end portion of the decentering pin 41, which is decentered from the portion fitted with the stationary lens barrel 22 is engaged with a groove portion 40 formed in the guide shaft 36.

The stationary lens barrel 22 is moved in the direction of the optical axis with respect to the lens barrel base 24 by rotating the decentering pin 41. A bearing 42 is disposed at one end of the stationary lens barrel 23. An engaging portion 47 engaged with the guide shaft 35 is disposed at the other end of the stationary lens barrel 23. The inner diameter portion of the bearing 42 is locked by the guide shaft 36. The outer diameter portion of the bearing 42 has a spherical shape and pivotally supports the stationary lens barrel 23.

While being engaged, the engaging portion 47 is sufficiently small relative to the engaging diameter and hence can be both moved and inclined with respect to the guide shaft 35. Elastic members 48 and 49 are disposed at an end portion, of the stationary lens barrel 23, located on the engaging portion 47 side so as to press the stationary lens barrel 23 against the lens barrel base 24. Adjustment screws 43 and 44 are provided near the guide shaft 35 on the stationary lens barrel 23 side of the lens barrel base 24 to press the stationary lens barrel 23, which is biased by the elastic members 48 and 49, thereby positioning the stationary lens barrel 23. The decentering pin 41 and the adjustment screws 43 and 44 constitute one element of the adjustment mechanism. By adjusting the advancing/retreating movement of the adjustment screws 43 and 44 of the lens barrel base 24, the stationary lens barrel 23 is tilted or pivoted about the bearing 42 so as to be adjusted.

With this construction, various aberrations such as the curvatures of field caused by processing/manufacturing errors of the lenses G2 to G7 are corrected by rotating the decentering pin 41 to adjust the position of the stationary lens barrel 22. In addition, backlash focusing errors due to a backlash based on the difference between the lens diameter and the lens fitting diameter of a lens barrel and positional shifts are corrected by tilting the stationary lens barrel 23 with the adjustment screws 43 and 44.

Movable lens barrels (lens barrels) 30 and 31 are moved on the optical axis to change the magnification. The lenses G2, G3, and G4 are assembled in the lens barrel 30. The lenses G5, G6, and G7 are assembled in the lens barrel 31. The lens barrels 30 and 31 are moved on the guide shafts 35 and 36, supported on the lens barrel base 24, in the direction of the optical axis.

A cam plate 26 is movably guided along the lens barrel base 24 and is coupled to a cam groove plate 10 through a projection formed on one end of the cam plate 26. Cam grooves 27 and 28 and a cam surface 29 are formed on the cam plate 26. The protruding pins 32 and 33 protruding from the movable lens barrels 30 and 31 are respectively coupled to the cam grooves 27 and 28. A lower portion of a stop plate 34 is in contact with the upper surface of the cam surface 29.

In this case, the stop plate 34 is a member for restricting a beam of light and is arranged between the movable lens barrels 30 and 31 to be freely moved along the guide shafts 35 and 36 as guide members in the direction of the optical axis. The lens barrel base 24 is guided by a guide rail 9 disposed on a lens mount 7 and is moved to a predetermined position by a wire 25 driven by a drive source (not shown).

In this embodiment, when an image forming magnification is set, and a start key is depressed, the drive source is rendered operative. The driving force of the drive source is transmitted to the wire 25, and the lens barrel base 24 is guided by the guide rail 9 to be moved to a designated position. At this time, the cam plate 26 is also moved. Since one end of the cam plate 26 is guided by the cam groove plate 10, the cam plate 26 is moved within the lens barrel base 24. The movable lens barrels 30 and 31 are guided by the cam grooves 27 and 28 of the cam plate 26 and are moved within the lens barrel base 24 in the direction of the optical axis in accordance with the cam shapes.

Similarly, the stop plate 34 is moved in accordance with the shape of the cam surface 29 of the cam plate 26. With this operation, the focal length of the lens unit is changed in accordance with various image forming magnifications, and the distance from the surface of the original 1 to that of the photosensitive drum 4 is kept in a conjugate relationship, thereby obtaining enlarged or reduced images.

By adjusting the position and posture of each lens in this manner, curvatures of field due to lens processing/manufacturing errors, and backlash focusing errors due to decentering and tilting of each lens are corrected.

In the embodiment, since the lens position adjustment portions are provided on the lens barrel guide portions disposed on the right and left sides of the lens groups, strain is hard to be produced in the lens barrel and lens portions, and stable optical performance can be obtained. In addition, since the adjustment mechanisms are provided on the right and left sides of the lens system, an increase in the height of the lens system can be suppressed, and the relatively large right and left spaces can be effectively used to realize a reduction in the size of the overall apparatus.

Figure 27:
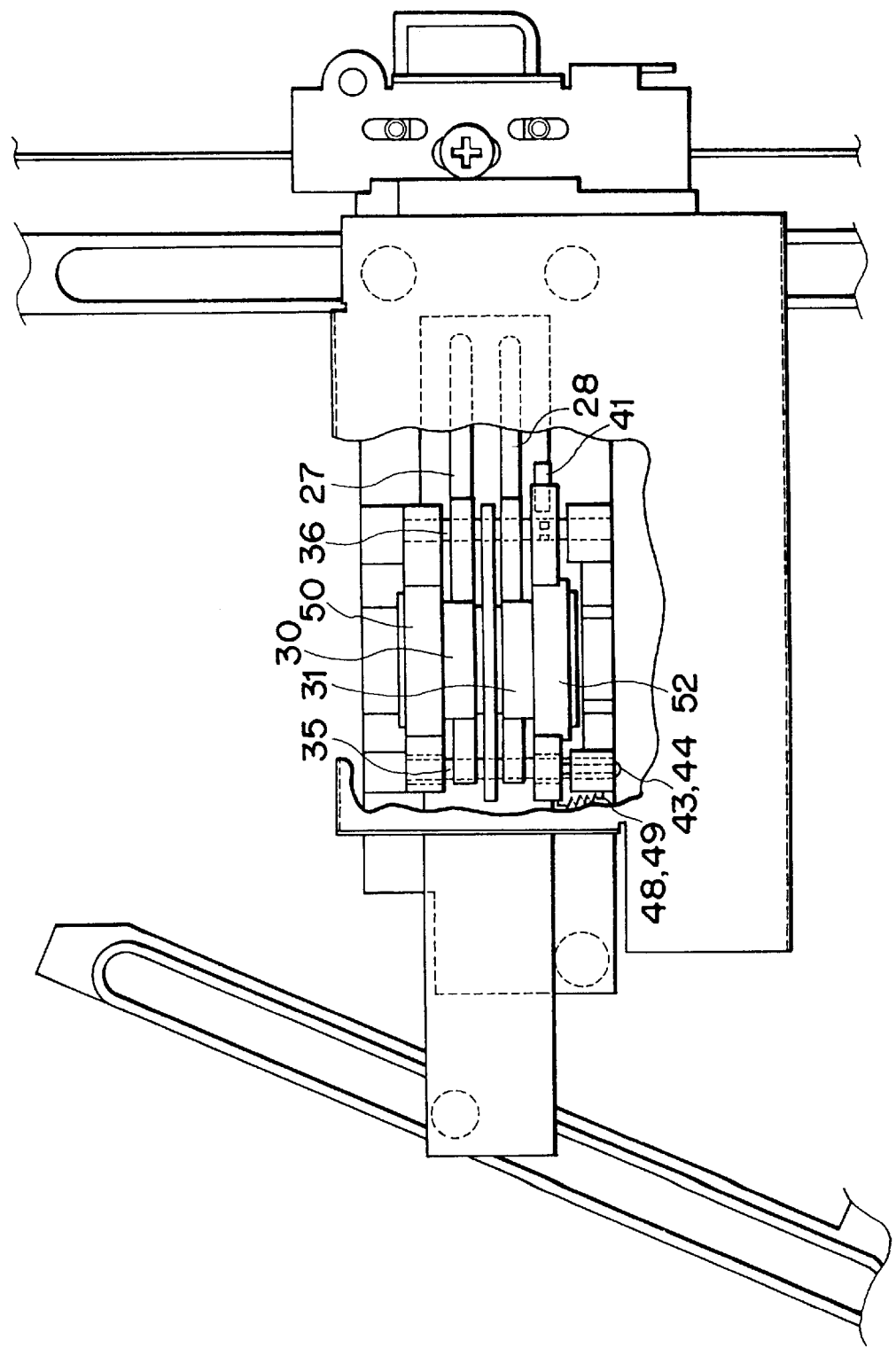
FIG. 27 is a plan view of a main part of an imaging lens portion of the second embodiment of the lens holding unit according to the present invention.
Figure 28:
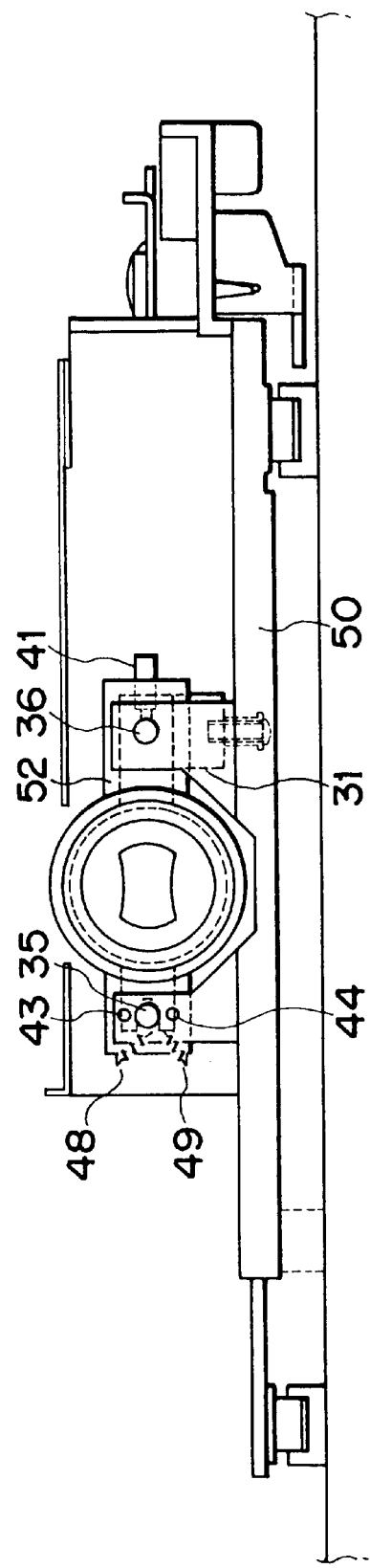
FIG. 28 is a side view of a main part of an imaging lens portion of the second embodiment of the lens holding unit according to the present invention.

FIGS. 27 and 28 are plan and side views, respectively, showing a zoom lens portion of the second embodiment of the lens holding unit of the present invention.

In this embodiment, a stationary lens barrel on the object side and a lens barrel base are integrated into a lens barrel 50. Lens position adjustment is performed by adjusting only a stationary lens barrel 52 on the image side with a decentering pin 41 and adjustment screws 43 and 44. Note that in this embodiment, lens position adjustment may be performed by using the lens barrel 50 on the object side as a movable lens barrel.

Figure 29:
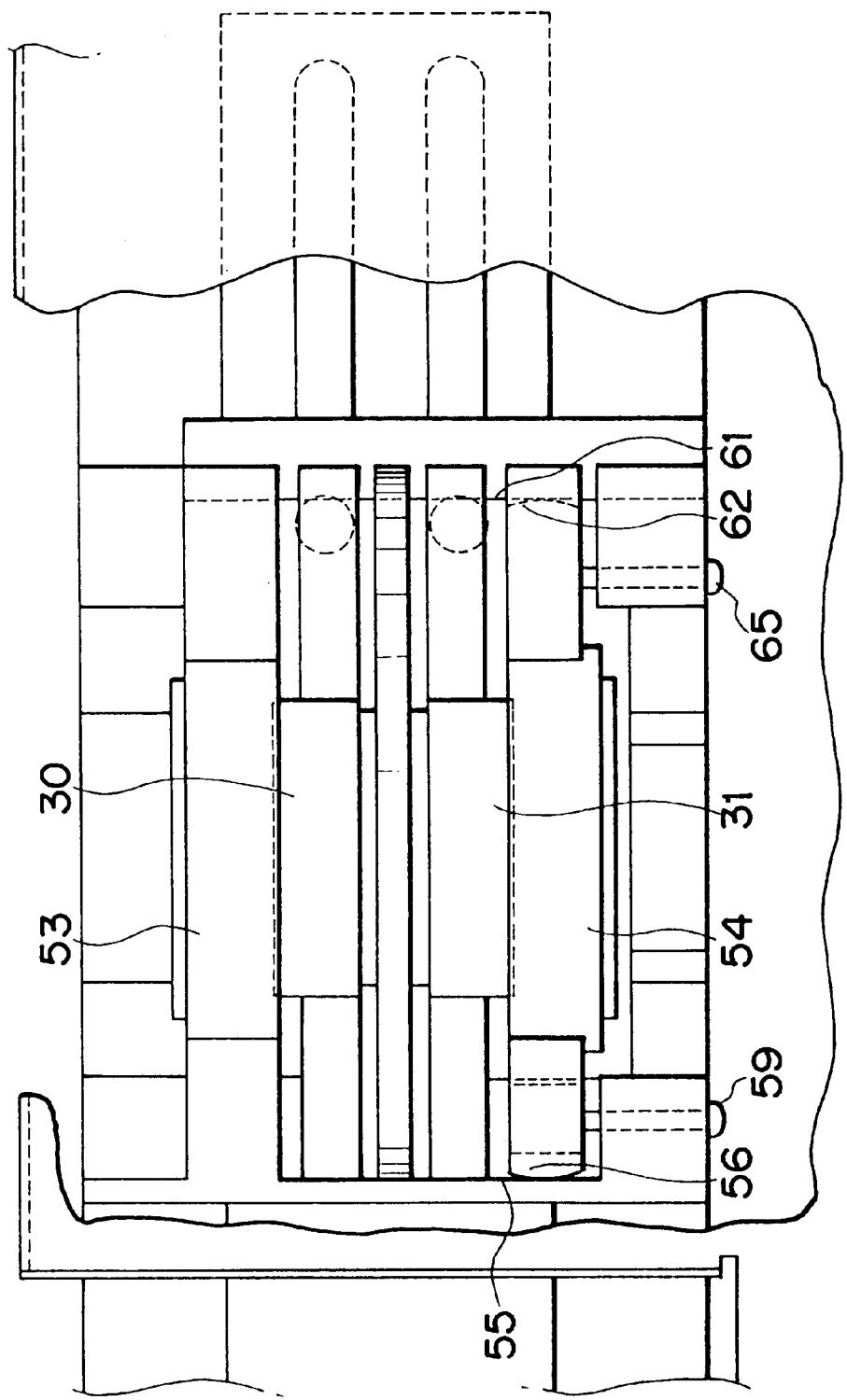
FIG. 29 is a plan view of a main part of an imaging lens portion of the third embodiment of the lens holding unit according to the present invention.
Figure 30:
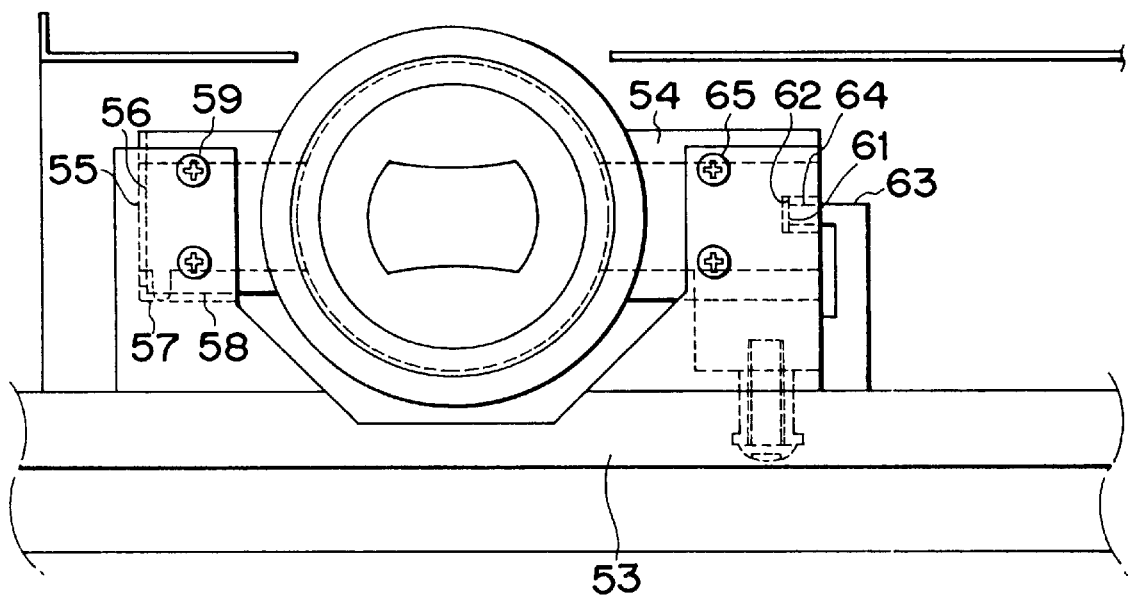
FIG. 30 is a side view of a main part of an imaging lens portion of the third embodiment of the lens holding unit according to the present invention.

FIGS. 29 and 30 are plan and side views, respectively, showing a zoom lens portion as the third embodiment of the lens holding unit of the present invention.

Referring to FIGS. 29 and 30, a lens barrel base 53 has one of stationary barrels, and lateral guide portions 55 and 61 and height-direction guide portions 57 and 63 for movable lens barrels 30 and 31 and the other stationary lens barrel 54. The other stationary lens barrel 54 has slide surfaces 56, 58, 62, and 64 respectively corresponding to the guide portions 55, 57, 61, and 63 of the lens barrel base 53. For example, these slide surfaces are formed into curved surfaces. They support the stationary lens barrel 54 and hold it such that the stationary lens barrel 54 can be tilted and adjusted. Lens position adjustment is performed by using adjustment screws 59 and 65 pivotally supported by the stationary lens barrel 54.

Figure 31:
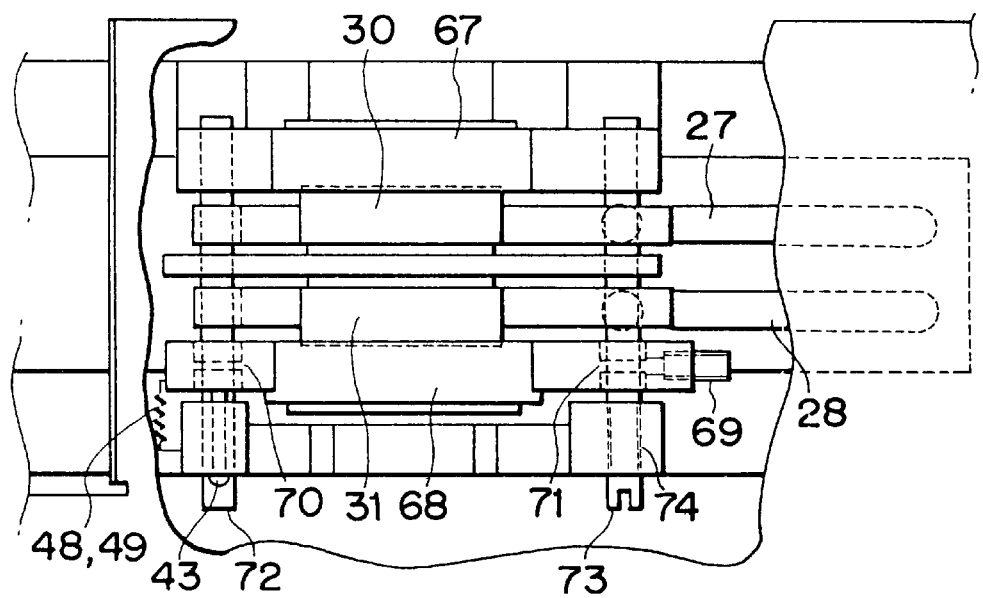
FIG. 31 is a plan view of a main part of an imaging lens portion of the fourth embodiment of the lens holding unit according to the present invention.
Figure 32:
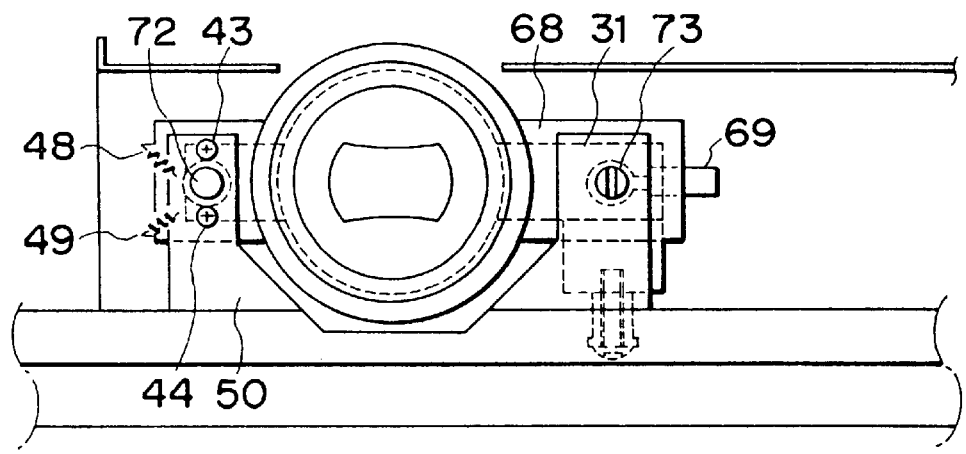
FIG. 32 is a side view of a main part of an imaging lens portion of the fourth embodiment of the lens holding unit according to the present invention.

FIGS. 31 and 32 are plan and side views, respectively, showing a zoom lens portion of the fourth embodiment of the lens holding unit according to the present invention.

Referring to FIGS. 31 and 32, a lens barrel base 67 has one of stationary lens barrels and holds guide shafts 72 and 73. The other stationary lens barrel 68 is guided by the guide shafts 72 and 73 at bearing portions 70 and 71 so as to be freely tilted and slid, and is held on the guide shaft 73 with a fixing pin 69 to be freely tilted. Lens position adjustment is performed by rotating the guide shaft 73 and using adjustment screws 43 and 44.

Figure 33A:
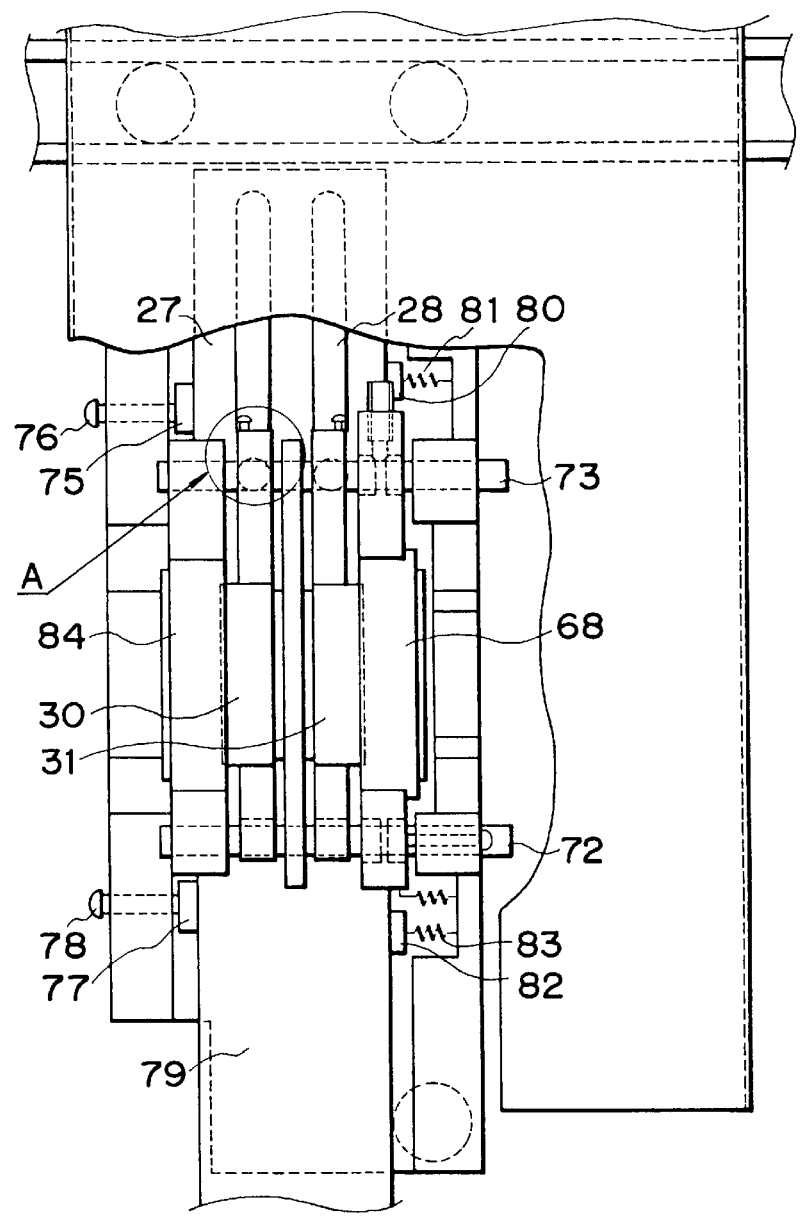
FIG. 33A is a plan view of a main part of an imaging lens portion of the fifth embodiment of the lens holding unit according to the present invention.
Figure 33B:
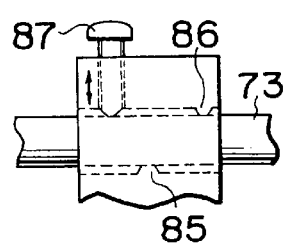
FIG. 33B is an enlarged view of a portion A in FIG. 33A.
Figure 34:
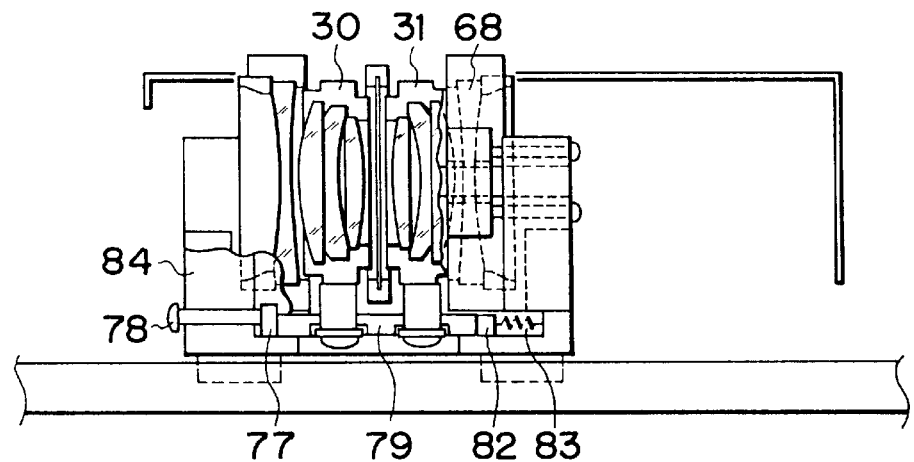
FIG. 34 is a side view of a main part of an imaging lens portion of the fifth embodiment of the lens holding unit according to the present invention.

FIGS. 33A and 34 are plan and side views, respectively, showing a zoom lens portion of the fifth embodiment of the lens holding unit according to the present invention. FIG. 33B is an enlarged view of a portion A in FIG. 33A.

Referring to FIGS. 33A, 33B and 34, a mirror lens base 84 has one of stationary lens barrels and holds guide shafts 72 and 73. The other stationary lens barrel 68 is supported on the guide shafts 72 and 73. Movable lens barrels 30 and 31 are also supported on the guide shafts 72 and 73 and are moved in accordance with the shapes of cams 27 and 28 of a cam plate 79.

In this case, a fitting portion between each of the movable lens barrels 30 and 31 and the guide shaft 73 has a shape such as the one shown in FIG. 33B, which is an enlarged view of a portion A in FIG. 33A. More specifically, the movable lens barrel 30 is fitted on the guide shaft 73 by projections 85 and 86 and the distal end portion of an adjustment screw 87. The other movable lens barrel 31 is fitted on the guide shaft 73 in the same manner.

The cam plate 79 is guided by guide members 75 and 77 mounted on a mirror lens base 84 with adjustment screws 76 and 78, and by guide members 80 and 82 supported on elastic members 81 and 83. The guide members 75 and 77 respectively oppose the guide members 80 and 82. Lens position adjustment is performed by moving the movable lens barrels 30 and 31 in the direction of the optical axis by the adjustment screws 76 and 78 and tilting them with respect to the optical axis by the adjustment screw 87.

Each of the above-described embodiments associated with the lens holding unit exemplifies the manual lens position adjustment scheme. However, the present invention may use an automatic adjustment scheme. In this scheme, a drive source, e.g., a stepping motor, is connected to each adjustment screw, and an image sensor is arranged at a focal plane behind the lens system. With this construction, an image defocus amount is detected to automatically move each adjustment screw.

As described above, in the first to fifth embodiments of the lens holding unit, an adjustment mechanism for adjusting the lens position of a lens barrel in the direction of the optical axis is provided near guide members for guiding the lens barrel of a zoom lens, together with an adjustment mechanism for adjusting the angle of the lens optical axis of the lens barrel with resect to the lens optical axis of the other lens barrel. With this construction, since no strain is produced in the lens barrels and the lenses in lens position adjustment, the lenses can be stably held, and stable optical performance can be obtained. In addition, the adjustment mechanism for lens position is provided on the right and left sides of the lens holding portion of the lens barrels, on which relatively large spaces are ensured. With this construction, an increase in the height of the zoom lens is suppressed to realize a reduction in the size of the overall apparatus.

Figure 35:
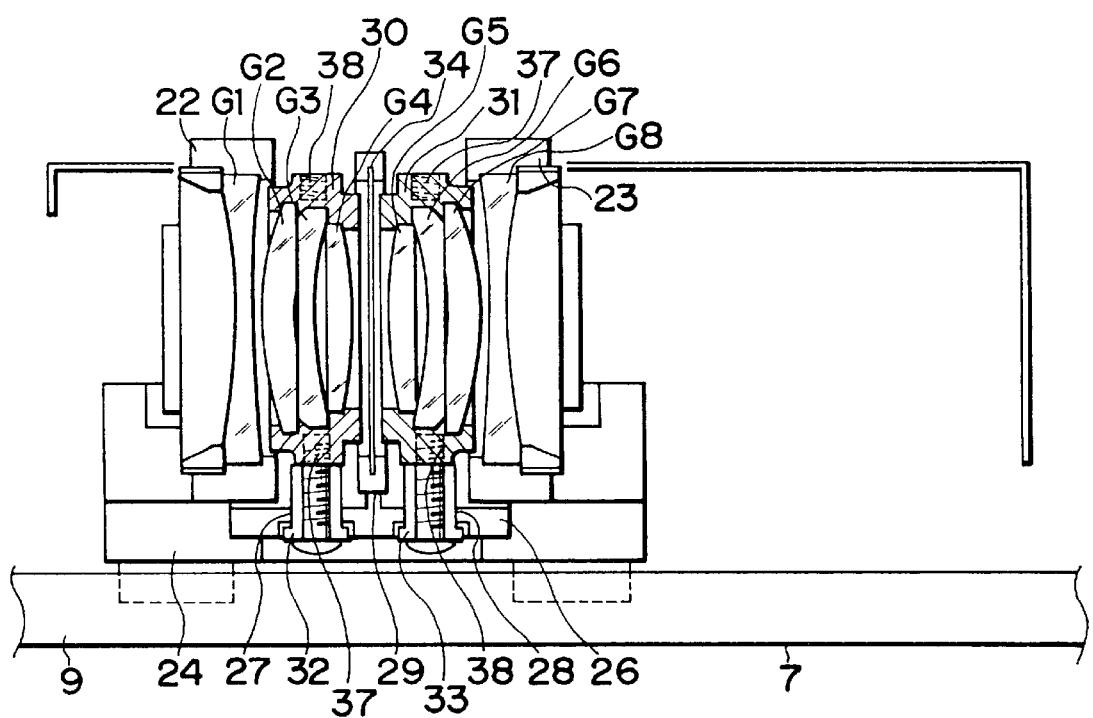
FIG. 35 is a sectional view of a main part of an imaging lens portion of the sixth embodiment of the lens holding unit according to the present invention.
Figure 36:
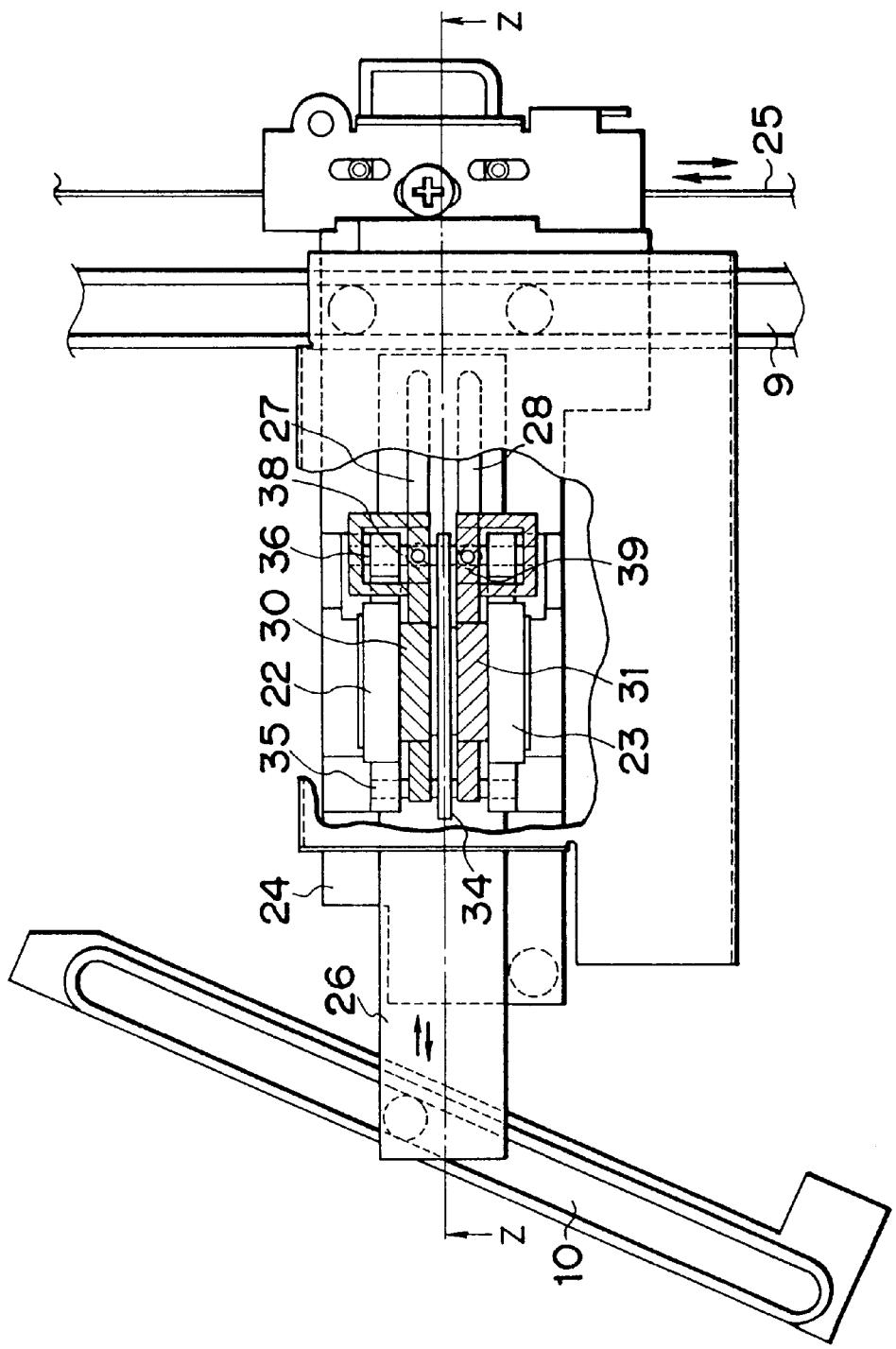
FIG. 36 is a plan view of a main part of an imaging lens portion of the sixth embodiment of the lens holding unit according to the present invention.
Figure 37:
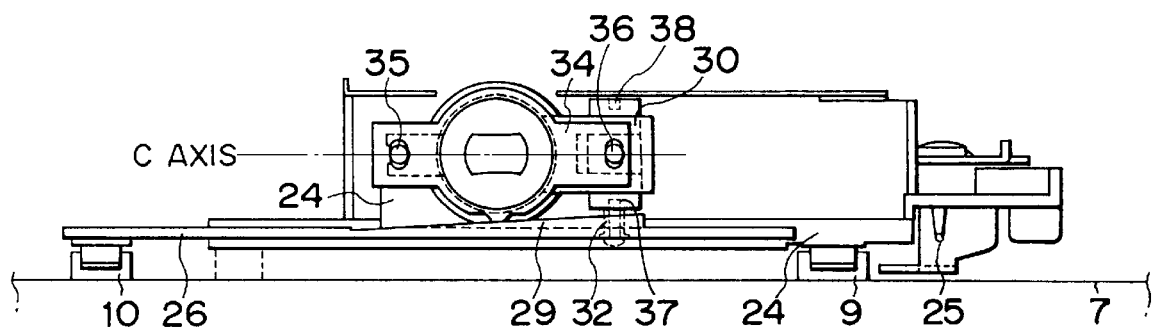
FIG. 37 is a sectional view taken along a line Z—Z in FIG. 36.

FIG. 35 is a sectional view showing a main part of the sixth embodiment of the lens holding unit according to the present invention. FIG. 36 is a plan view showing a main part of the sixth embodiment of the lens holding unit of the present invention. FIG. 37 is a sectional view taken along a line Z—Z in FIG. 36.

In this embodiment, a plurality of guide members are provided on both sides of the optical axis of a lens system in the slit longitudinal direction so as to be parallel to the optical axis. With this construction, a plurality of lens barrels are moved while being guided by the same guide members. The embodiment is characterized in that at least one pair of guide members of the guide members for guiding the lens barrels are arranged on both sides of the optical axis of the lens system, and coupling members for coupling movable lens barrels to moving members for driving the movable lens barrels are provided near the guide members of the lens barrels.

A characteristic feature of the construction of the embodiment will be described next. Referring to FIGS. 35 to 37, stationary lens barrels 22 and 23 respectively incorporate a lens G1 and a lens G8. The stationary lens barrels 22 and 23 are supported by guide shafts 35 and 36 as guide members parallel to the optical axis. Each of the guide shafts 35 and 36 has two ends supported by a lens barrel base 24.

Movable lens barrels 30 and 31 are moved on the optical axis to change the magnification. Lenses G2, G3, and G4 are assembled in the lens barrel 30. Lenses G5, G6, and G7 are assembled in the lens barrel 31. The movable lens barrels 30 and 31 are moved on the guide shafts 35 and 36, supported by the lens barrel base 24, in the direction of the optical axis.

A cam plate 26 is movably guided by the lens barrel base 24, and is coupled to a cam groove plate 10 with a projection formed on one end of the cam plate 26. Cam grooves 27 and 28 and a cam surface 29 are formed on the cam plate 26. Protruding pins 32 and 33 protruding from the movable lens barrels 30 and 31 are respectively coupled to the cam grooves 27 and 28. A lower portion of a stop plate 34 is in contact with the upper surface of the cam surface 29.

In this case, the stop plate 34 is a member for restricting a beam of light and is arranged between the movable lens barrels 30 and 31 to be freely moved along the guide shafts 35 and 36 as guide members in the direction of the optical axis. The lens barrel base 24 is guided by a guide rail 9 disposed on a lens mount 7 and is moved to a predetermined position by a wire 25 driven by a drive source (not shown).

In this embodiment, when an image forming magnification is set, and a start key is depressed, the drive source is rendered operative. The driving force of the drive source is transmitted to the wire 25, and the lens barrel base 24 is guided by the guide rail 9 to be moved to a designated position. At this time, the cam plate 26 is also moved. Since one end of the cam plate 26 is guided by the cam groove plate 10, the cam plate 26 is moved within the lens barrel base 24. The movable lens barrels 30 and 31 are guided by the cam grooves 27 and 28 of the cam plate 26 and are moved within the lens barrel base 24 in the direction of the optical axis in accordance with the cam shapes.

Similarly, the stop plate 34 is moved in accordance with the shape of the cam surface 29 of the cam plate 26. With this operation, the focal length of the lens unit is changed in accordance with various image forming magnifications, and the distance from the surface of the original 1 to that of the photosensitive drum 4 is kept in a conjugate relationship, thereby obtaining enlarged or reduced images.

Mounting portions 37 and 38 having the same shape are formed on the movable lens barrel 30 at positions near the guide shaft 36 to be substantially symmetrical about an axis C in FIG. 37. The protruding pins 32 and 33 are respectively fitted in the mounting portions 37 and 38. The portions, of the movable lens barrel 30, with which the guide shafts 35 and 36 arranged between the stationary lens barrels 22 and 23 are in contact are also symmetrical about the axis C in FIG. 37.

The lenses G2, G3, and G4, and the lenses G5, G6, and G7 are symmetrical about the stop plate 34. For this reason, if the movable lens barrel 30 is reversed with respect to the axis C in FIG. 37, the movable lens barrel 30 can be used as the movable lens barrel 31. That is, identical movable lens barrels are used. One lens barrel having the protruding pin 32 fitted in the mounting portion 37 is used as the movable lens barrel 30. The other lens barrel having the protruding pin 33 fitted in the mounting portion 38 is used as the movable lens barrel 31. The protruding pins 32 and 33 are also identical.

As described above, since the identical movable lens barrels 30 and 31 are used such that one of them is vertically reversed to the other with respect to the stop (in the direction of the optical axis), the distance from the guide shaft 36 of the movable lens barrels 30 and 31 assembled in the lens barrel base 24 to the central axis of the lens system becomes constant. Consequently, an aberration produced at the front group becomes the same as that produced at the rear group. That is, an increase in aberration can be prevented, thus maintaining good image formation performance.

In the embodiment, the guide shafts 35 and 36 as guide members for guiding the movable lens barrels 30 and 31 are arranged on both sides of the lens optical axis. The lateral position of each movable lens barrel is set by the guide shaft 35, while the vertical position of each movable lens barrel is set by the guide shaft 36. With this construction, when the guide shafts 35 and 36 are decentered, the influence of the decentering on the lens optical axis is given by (positional decentering amounts of guide shafts)×{(distance from guide shaft 35 to lens optical axis)/(distance from guide shaft 35 to guide shaft 36)}. That is, a reduction in error at the guide shaft portion can be achieved.

In addition, the protruding pins 32 and 33 for moving the movable lens barrels 30 and 31 are not arranged below the lens barrels supporting the lens system but are arranged near the guide shaft 35. For this reason, the height of the zoom lens unit can be decreased without reducing the thickness of the lens barrel portion to reduce its height.

That is, since the thickness of each lens barrel need not be reduced, deformation of each lens barrel and tilting of each lens group can be prevented, which are caused by a pressing force produced upon mounting of a lens press ring, or an impact produced upon assembly of a lens system. Therefore, the height of the zoom lens unit can be decreased without causing a deterioration in image formation performance due to asymmetrical curvatures of field which are caused when each lens barrel is deformed and each lens group is tilted.

Figure 38:
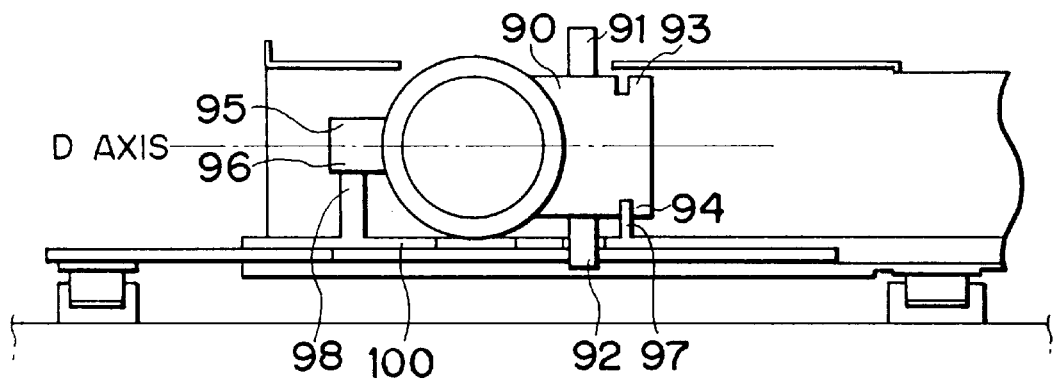
FIG. 38 is a sectional view of a main part of an imaging lens portion of the seventh embodiment of the lens holding unit according to the present invention.

FIG. 38 is a sectional view showing a main part of a movable lens barrel portion of a zoom lens associated with the seventh embodiment of the lens holding unit according to the present invention.

Projections 91 and 92 which are driven, groove portions 93 and 94 as guide portions, and slide portions 95 and 96 as guide surfaces are provided on a movable lens barrel 90 to be symmetrical about an axis D. The movable lens barrel 90 is moved while being guided by a projection 97 and supported by a projection 98. Both the projections 97 and 98 are formed on a lens barrel base 100. A zoom lens unit is constituted by the movable lens barrel 90 and an identical lens barrel 90 which is reversed about an axis D as an axis of symmetry. The movable lens barrels 90 are guided by guide portions constituted by portions of the frames of the movable lens barrels and portions of the lens barrel base 100 without using a special shaft, thereby simplifying the construction, and improving assembly efficiency and productivity.

Figure 39:
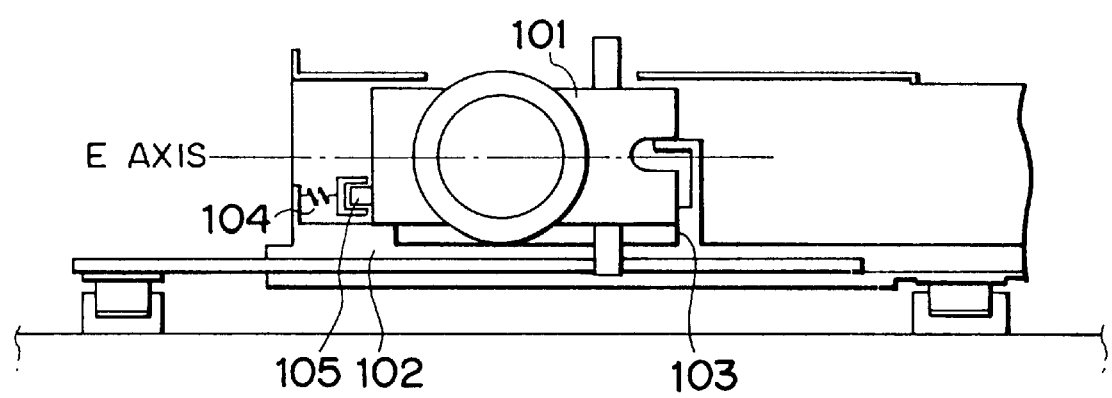
FIG. 39 is a sectional view of a main part of an imaging lens portion of the eighth embodiment of the lens holding unit according to the present invention.

FIG. 39 is a sectional view showing a main part of a movable lens barrel portion of a zoom lens associated with the eighth embodiment of the lens holding unit according to the present invention.

In this embodiment, the positioning precision of each movable lens barrel is further improved. A movable lens barrel 101 is guided while one surface is urged against a guide surface 103 formed on a lens barrel base 102, and the other surface is urged against a roller member 105 mounted on the lens barrel base 102 through an elastic member 104. With this construction, the movable lens barrel 101 is guided without a backlash.

Figure 40:
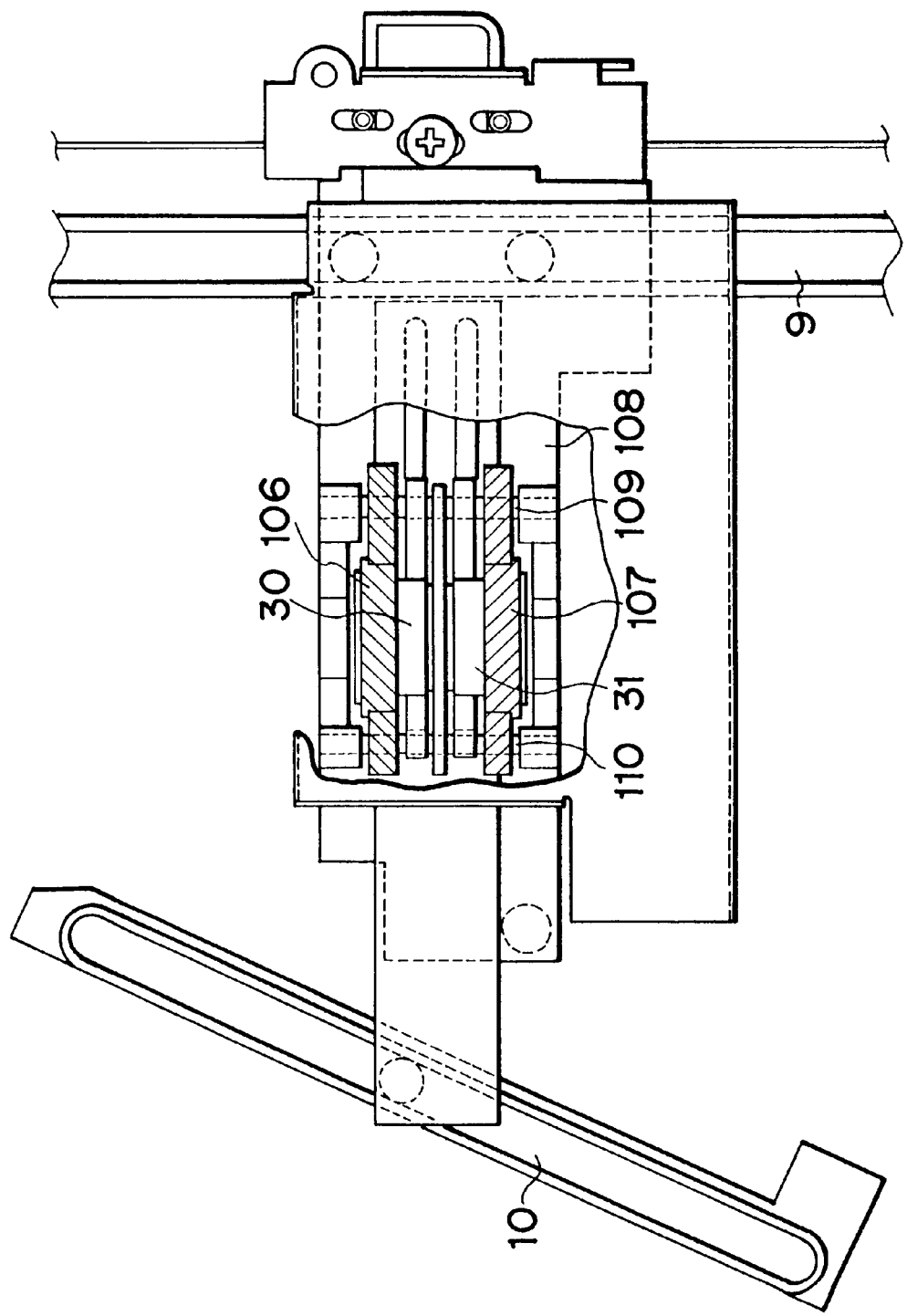
FIG. 40 is a plan view of a main part of an imaging lens portion of the ninth embodiment of the lens holding unit according to the present invention.
Figure 41:
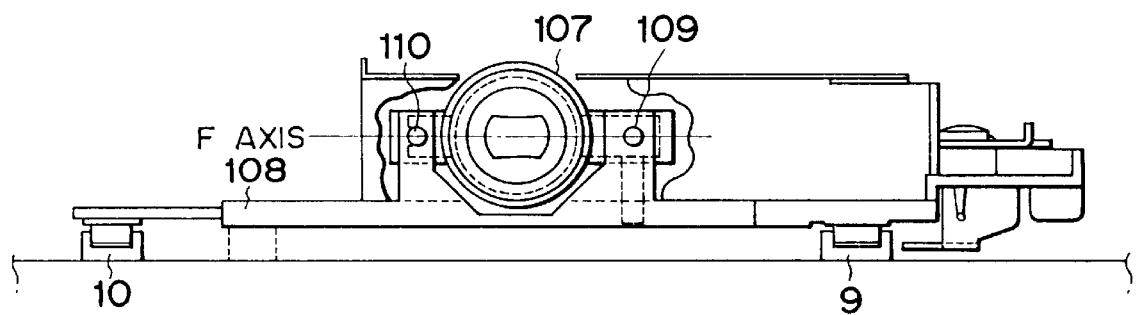
FIG. 41 is a side view of a main part of an imaging lens portion of the ninth embodiment of the lens holding unit according to the present invention.

FIGS. 40 and 41 are plan and side views, respectively, showing a main part of a zoom lens associated with the ninth embodiment of the lens holding unit according to the present invention.

In this embodiment, similar to movable lens barrels 30 and 31, identical stationary lens barrels 106 and 107 are used such that the stationary lens barrel 107 is reversed about an axis F as an axis of symmetry. The stationary lens barrels 106 and 107 are supported by guide shafts 109 and 110 provided on a lens barrel base 108, together with the movable lens barrels 30 and 31. Similar to the movable lens barrels, the stationary lens barrels use pairs of identical components, with one of each pair of components being reversed vertically (in the direction of the optical axis) with respect to the other, thereby decreasing the number of high-precision components and reducing errors in terms of precision.

In the sixth to ninth embodiments, the lens barrels are moved by using cams. However, other drive sources such as a stepping motors may be used. In addition, a lens obtained by cutting upper and lower portions of a lens with a large width, e.g., a round lens with a large aperture, may be used.

As described above, in the sixth to ninth embodiments, lens barrels holding the respective lenses of a zoom lens are guided by a plurality of guide members having central axes at points other than the optical axis of the lens system, and one of these lens barrels is reversed vertically (in the direction of the optical axis) so that they can be used as a pair of members. With this construction, the lenses can be held with high precision, and stable optical performance can be obtained.

In addition, guide members for guiding lens barrels are arranged on both sides of the lens optical axis, and coupling members for coupling the lens barrels to a drive source for driving the lens barrels are arranged near the guide members. With this construction, the height of a zoom lens can be decreased to realize a reduction in the size of the overall apparatus without causing a deterioration in lens holding performance.

As has been described, according to the present invention, there is provided an image pickup apparatus such as a copying machine having an adjustment mechanism suitable for a zoom lens unit, which can realize a reduction in the size of the overall lens system and an increase in the magnification of the lens system, while good optical characteristics of the lens system with respect to the overall image plane are maintained, by properly setting an adjustment mechanism and the like for adjusting optical characteristics which vary owing to a lens arrangement, manufacturing errors, assembly errors, and the like.

In addition, there is provided a lens holding unit which can properly adjust optical characteristics associated with curvatures of field, tilt of image plane, and the like to increase the tolerance of the processing precision of each lens barrel and each lens, which are to realize high performance, by properly arranging a lens barrel structure for moving lens groups along the optical axis and an adjustment mechanism for adjusting the optical positions of predetermined lens groups.

What is claimed is:

1. An image pickup apparatus comprising:

an imaging lens arranged between an object and an image forming surface, wherein said imaging lens comprises:

(i) a first group having a negative refracting power, (ii) a second group having a positive refracting power, (iii) a stop, (iv) a third group having a positive refracting power, and (v) a fourth group having a negative refracting power, said first group, said second group, said stop, said third group, and said fourth group being sequentially arranged from an object side, and said first to fourth groups being arranged substantially symmetrically about said stop, wherein an image forming magnification is changed, while an object-image distance is kept constant, by moving said imaging lens and moving said second group and moving said third group on an optical axis while fixing said first group and said fourth group, and an image formation characteristic of said imaging lens is adjusted such that an aberration of curvature of field is adjusted by moving at least one of said first and fourth groups on the optical axis and an aberration asymmetry with respect to the optical axis is adjusted by changing an angle of at least one of said first and fourth groups with respect to the optical axis.

2. An apparatus according to claim 1, wherein said change of the angle of at least one of said first and fourth groups with respect to the optical axis is performed by causing at least one of said first and fourth groups to pivot about an axis passing a principal point thereof.

3. An apparatus according to claim 1, wherein the aberration asymmetry is a tilt of an image plane, and said tilt of the image plane is adjusted by changing the angle of at least one of said first and fourth groups with respect to an ideal optical axis of said imaging lens.

4. A method of varying an image formation magnification in an image pickup apparatus having a variable magnification mechanism, said method comprising the steps of:

arranging an imaging lens, said imaging lens comprising (i) a first group having a negative refracting power, said first group being fixed upon varying the magnification, (ii) a second group having a positive refracting power, said second group being moved upon varying the magnification, (iii) a stop, (iv) a third group having a positive refracting power, said third group being moved upon varying the magnification, and (v) a fourth group having a negative refracting power, said fourth group being fixed upon varying the magnification, and said first group, said second group, said stop, said third group, and said fourth group being sequentially arranged from an object side, and said first to fourth groups being arranged substantially symmetrically about said stop, adjusting an image formation characteristic of said imaging lens such that an aberration of curvature of field is adjusted by moving at least one of said first and fourth groups on the optical axis and an aberration asymmetry with respect to the optical axis is adjusted by changing an angle of at least one of said first and fourth groups with respect to the optical axis;

arranging said imaging lens between an object and an image forming surface; and moving said imaging lens and moving said second group and said third group on the optical axis while an object-image distance is kept constant to thereby vary the image formation magnification.

5. A method according to claim 4, wherein the aberration asymmetry is a tilt of an image plane, and said tilt of the image plane is adjusted by changing the angle of at least one of said first and fourth groups with respect to an ideal optical axis of said imaging lens.

6. A method of adjusting an imaging lens used in an image pickup apparatus having a variable magnification mechanism, said method comprising the steps of:

arranging an imaging lens, said imaging lens comprising (i) a first group having a negative refracting power, said first group being fixed upon varying the magnification, (ii) a second group having a positive refracting power, said second group being moved upon varying the magnification, (iii) a stop, (iv) a third group having a positive refracting power, said third group being moved upon varying the magnification, and (v) a fourth group having a negative refracting power, said fourth group being fixed upon varying the magnification, and said first group, said second group, said stop, said third group, and said fourth group being sequentially arranged from an object side, and said first to fourth groups being arranged substantially symmetrically about said stop, and adjusting an image formation characteristic of said imaging lens such that an aberration of curvature of field is adjusted by moving at least one of said first and fourth groups on the optical axis and an aberration asymmetry with respect to the optical axis is adjusted by changing an angle of at least one of said first and fourth groups with respect to the optical axis.

7. A method according to claim 6, wherein the aberration asymmetry is a tilt of an image plane, and the tilt of the image plane is adjusted by changing the angle of at least one of said first and fourth groups with respect to an ideal optical axis of said imaging lens.

* * * * *